US012343900B2

(12) United States Patent
Bahler

(10) Patent No.: US 12,343,900 B2
(45) Date of Patent: Jul. 1, 2025

(54) BLOCK CONFIGURATION

(71) Applicant: Toolbro Innovators, LLC, Vernon, CT (US)

(72) Inventor: Philip J. Bahler, Vernon, CT (US)

(73) Assignee: TOOLBRO INNOVATORS, LLC, Vernon, CT (US)

(*) Notice: Subject to any disclaimer, the term of this patent is extended or adjusted under 35 U.S.C. 154(b) by 0 days.

(21) Appl. No.: 18/755,220

(22) Filed: Jun. 26, 2024

(65) Prior Publication Data

US 2024/0342952 A1 Oct. 17, 2024

Related U.S. Application Data

(63) Continuation of application No. PCT/US2023/027782, filed on Jul. 14, 2023.

(60) Provisional application No. 63/438,713, filed on Jan. 12, 2023, provisional application No. 63/389,021, filed on Jul. 14, 2022.

(51) Int. Cl.
*B28B 7/24* (2006.01)
*E01C 5/06* (2006.01)

(52) U.S. Cl.
CPC . *B28B 7/24* (2013.01); *E01C 5/06* (2013.01)

(58) Field of Classification Search
CPC .................................... B28B 7/24; E01C 5/06
USPC ............................................... 404/34, 36, 72
See application file for complete search history.

(56) References Cited

U.S. PATENT DOCUMENTS 3,524,790 A 8/1970 Mason
4,127,349 A 11/1978 Rasmussen
5,487,526 A 1/1996 Hupp
7,632,036 B2 * 12/2009 Dupuis .................... E01C 5/00 404/34
2006/0056912 A1 3/2006 Altmann et al.
2007/0166102 A1 * 7/2007 Cornaz .................. E04F 15/08 404/34
2009/0255211 A1 * 10/2009 Collison ............... B28B 7/0038 52/745.19
2020/0165822 A1 5/2020 Kreizinger

FOREIGN PATENT DOCUMENTS

CN 107100060 A 8/2017
DE 202014004045 U1 * 7/2014 ............... B28B 7/24

OTHER PUBLICATIONS

International Search Report issued in International Application No. PCT/US2023/027782 mailed Oct. 6, 2023.
Written Opinion issued in International Application No. PCT/US2023/027782 mailed Oct. 6, 2023.

* cited by examiner

*Primary Examiner* — Raymond W Addie
(74) *Attorney, Agent, or Firm* — CANTOR COLBURN LLP

(57) ABSTRACT

A mold for a configuration of a paver block layer, having: a mold outer boundary that defines a rectangular or square shape, and within the mold outer boundary, the mold defines block shaped cavities that include: square block cavities, each having a first cavity area; small block cavities, each having a second cavity area that is smaller than first cavity area; large block cavities, each having a third cavity area that is larger than the first cavity area, wherein block joints are defined by the mold, between adjacent ones of the block cavities, and the block joints define an X-less configurations.

22 Claims, 25 Drawing Sheets s100

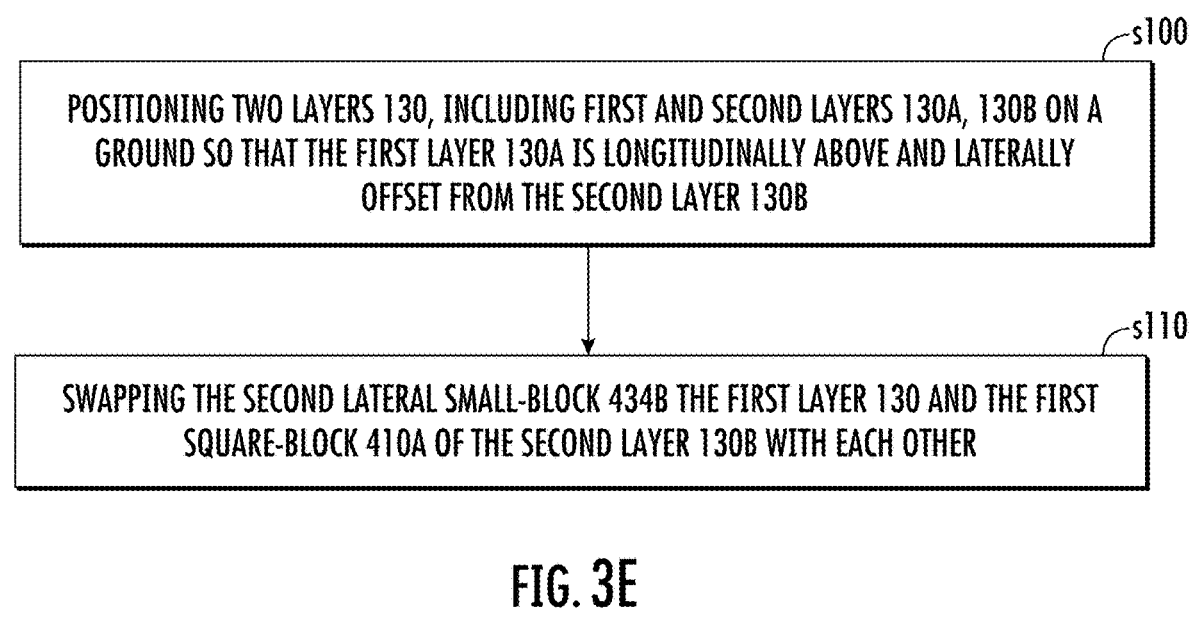

POSITIONING TWO LAYERS 130, INCLUDING FIRST AND SECOND LAYERS 130A, 130B ON A GROUND SO THAT THE FIRST LAYER 130A IS LONGITUDINALLY ABOVE AND LATERALLY OFFSET FROM THE SECOND LAYER 130B s110

SWAPPING THE SECOND LATERAL SMALL-BLOCK 434B THE FIRST LAYER 130 AND THE FIRST SQUARE-BLOCK 410A OF THE SECOND LAYER 130B WITH EACH OTHER

FIG. 3E

BLOCK CONFIGURATION

CROSS REFERENCE TO RELATED APPLICATIONS

This application claims priority to International Application No. PCT/US2023/027782, filed on 24 Aug. 2023, which claims the benefit of U.S. Provisional Patent Application No. 63/389,021, filed 14 Jul. 2022, and U.S. Provisional Patent Application No. 63/438,713, filed 12 Jan. 2023, the entire contents of each of which is incorporated herein by reference.

BACKGROUND

The embodiments are directed to paver systems and more specifically to a paver system that provides an array of blocks that form x-less joint patterns via a pallet configuration and an automatic sorting device.

Paver block configurations aim to have a random appearance when placed on a floor. X-shaped joints can detract from that appearance and affect structure ability allowing for creeping or undesirable lateral movement.

BRIEF SUMMARY

Disclosed is a mold for a configuration of a paver block layer, including: a mold outer boundary that defines a rectangular or square shape, and within the mold outer boundary, the mold defines block shaped cavities that include: square block cavities, each having a first cavity area; small block cavities, each having a second cavity area that is smaller than first cavity area; large block cavities, each having a third cavity area that is larger than the first cavity area, wherein block joints are defined by the mold, between adjacent ones of the block cavities, and the block joints define an X-less configurations.

In addition to one or more of the disclosed aspects of the mold, or as an alternate, the small and large block cavities are rectangular.

In addition to one or more of the disclosed aspects of the mold, or as an alternate, each of the square block cavities is defined by side walls having a length L; each of the small block cavities is defined by first and second sidewalls having respective lengths L and 0.5L; and each of the large block cavities is defined by first and second sidewalls having respective lengths 1.5L and L.

In addition to one or more of the disclosed aspects of the mold, or as an alternate, the mold outer boundary is defined by: first and second ends that are spaced apart from each other by a longitudinal distance; and first and second sides that are spaced apart from each other by a lateral distance, and wherein the mold outer boundary defines one of: a square; an aspect ratio of 3.5 to 3, with the lateral distance being greater than the longitudinal distance; and an aspect ratio of 4 to 3, with the lateral distance being greater than the longitudinal distance.

In addition to one or more of the disclosed aspects of the mold, or as an alternate, along the first side of the mold, from the first end to the second end, the mold includes: a first small block cavity; a first square block cavity; and a first large block cavity, wherein: the first small block cavity is oriented so that the first sidewall of the first small block cavity extends laterally; and the first large block cavity is oriented so that the first sidewall of the large block cavity extends longitudinally.

In addition to one or more of the disclosed aspects of the mold, or as an alternate, laterally adjacent to the first small block cavity, along the first end, is a second small block cavity; laterally adjacent to the first large block cavity, along the second end, is a third small block cavity; and longitudinally between the second and third small block cavities is a second large block cavity, wherein: the second small block cavity is oriented so that the first sidewall of the second small block cavity extends longitudinally; the third small block cavity is oriented so that the first sidewall of the third small block cavity extends laterally; and the second large block cavity is oriented so that the first sidewall of the second large block cavity extends longitudinally.

In addition to one or more of the disclosed aspects of the mold, or as an alternate, laterally adjacent to the second small block cavity, along the first end, is a second square block cavity.

Further disclosed is a method of organizing layers of paver blocks, including: obtaining first and second layers formed from a mold having one or more of the above disclosed aspects, wherein each of the paver block is arranged as formed in the mold; laying the first and second layers on a ground so that the first and second layers are longitudinally adjacent and laterally offset by an offset factor, so that: the first end of the second layer is adjacent to the second end of the first layer; and a lower corner of the first layer, defined by an intersection of the first side and the second end of the first layer, is located along the first end of the second layer; and swapping a small block formed in the third small block cavity of first layer with a square block formed in the second square block cavity of the second layer, thereby obtaining an X-less joint pattern.

In addition to one or more of the disclosed aspects of the method, or as an alternate, the offset factor is 0.5×L.

In addition to one or more of the disclosed aspects of the mold, or as an alternate, the mold has an aspect ratio of 4×3 and includes: five square block cavities; five small block cavities; and three large rectangular blocks.

In addition to one or more of the disclosed aspects of the mold, or as an alternate, the mold has an aspect ratio of 4×3 and includes: four square block cavities; four small block cavities; and four large rectangular blocks.

In addition to one or more of the disclosed aspects of the mold, or as an alternate, the mold has an aspect ratio of 3.5×3 and includes: four square block cavities; four small block cavities; and three large rectangular blocks.

In addition to one or more of the disclosed aspects of the mold, or as an alternate, the mold has an aspect ratio of 3.5×3 and includes: five square block cavities; five small block cavities; and two large rectangular blocks.

In addition to one or more of the disclosed aspects of the mold, or as an alternate, the mold has an aspect ratio of 3.5×3 and includes: four square block cavities; four small block cavities; and three large rectangular blocks.

In addition to one or more of the disclosed aspects of the mold, or as an alternate, the mold outer boundary has a square shape and includes: four square block cavities; four small block cavities; and two large rectangular blocks.

Further disclosed is a layer of paver blocks formed with a mold having one or more of the aspects disclosed herein.

BRIEF DESCRIPTION OF THE DRAWINGS

The present disclosure is illustrated by way of example and not limited in the accompanying figures in which like reference numerals indicate similar elements.

The figures show paver blocks organized as layers and laid out as provided on a ground with multiple layers adjacent to each other.

FIG. 3E is a flowchart showing a method of manipulating one block from each of the two layers of blocks shown in FIG. 3D to provide the X-less joint pattern;

DETAILED DESCRIPTION

A detailed description of one or more embodiments of the disclosed apparatus and method are presented herein by way of exemplification and not limitation with reference to the Figures.

Figure 1B:
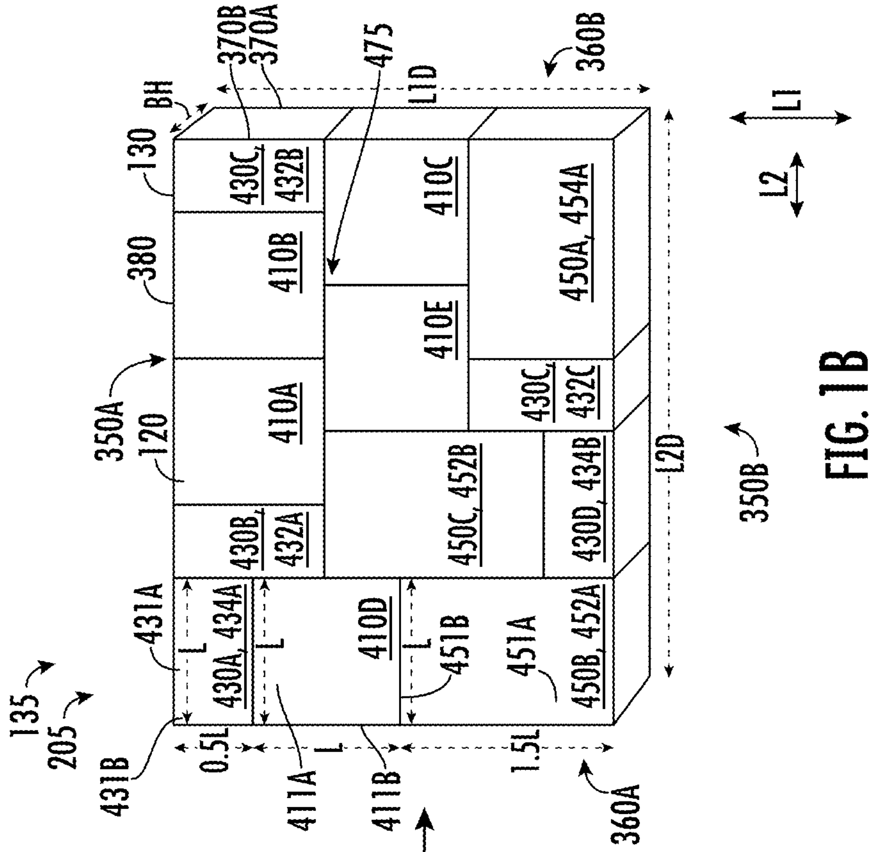
FIG. 1B shows a layer of blocks formed by the mold of FIG. 1A.
Figure 1A:
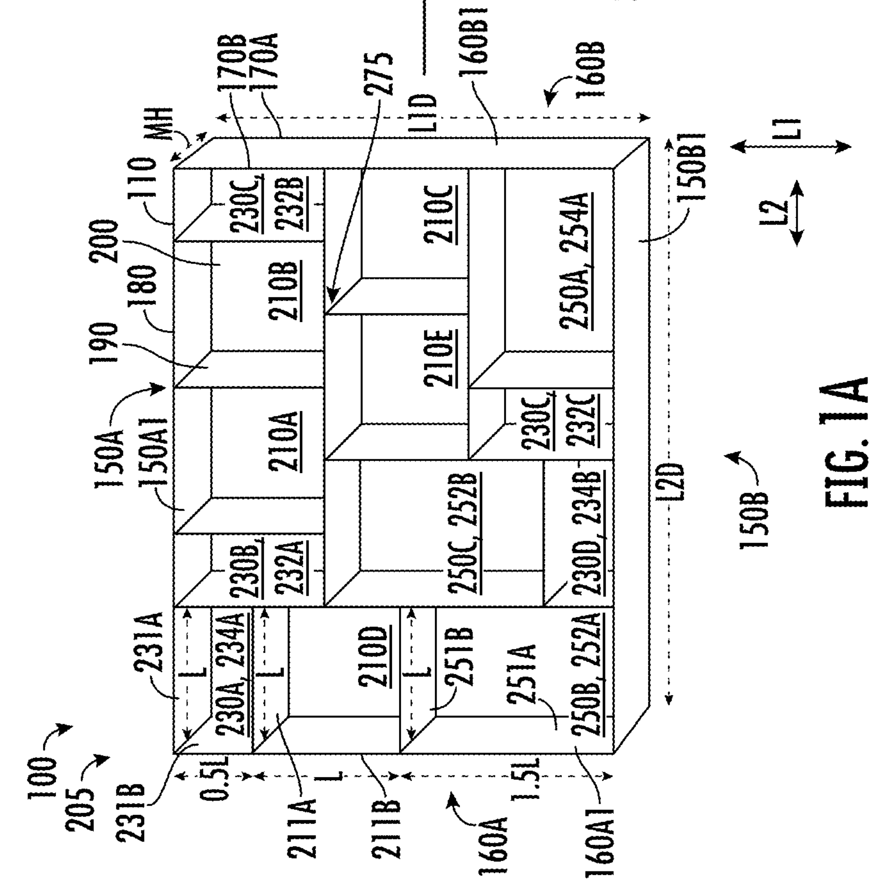
FIG. 1A shows a top plan view of a mold for fabricating paver blocks according to a first embodiment.

Turning to FIG. 1A, the figure shows a system 100 for providing a paver block configuration with X-less joints.

Figure 2B:
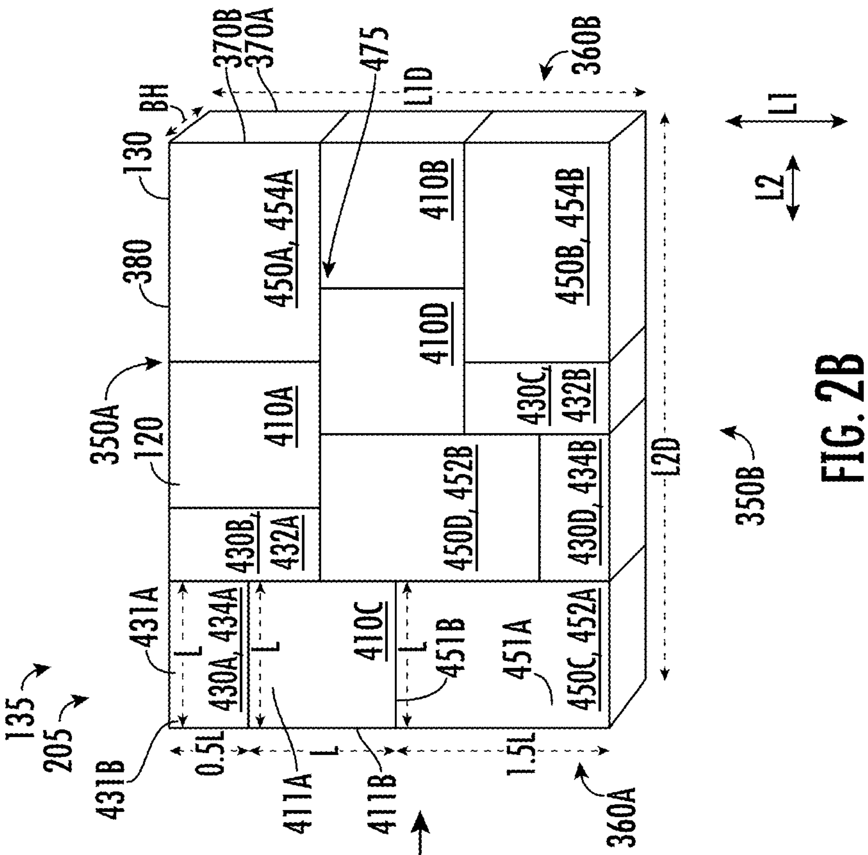
FIG. 2B shows a layer of blocks formed by the mold of FIG. 2A.

More specifically, FIG. 1A shows a top plan view of a mold 110 for fabricating paver blocks (or blocks) 120 in a paver block layer 130 shown in FIG. 2B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance LID, and in a second direction, laterally L2, between first and second sides 160A, 160B to side walls 160A1, 160A2 by a lateral distance L2D.

As shown in FIG. 1A, the perimeter (or outer boundary) 180 of the mold 110, e.g., in a plan view, is rectangular. The distance LID between the ends 150A, 150B of the mold 110 is smaller than the distance L2D between the sides 160A, 160B by a ratio of three by four (3×4), i.e., having an aspect ratio of 4×3. The mold 110 extends heightwise from a bottom 170A to a top 170B to define a mold height MH.

With reference to FIG. 1A, the mold 110 has internal partition walls 190 that divide the mold 110 into cavities 200 that form the blocks 120. There are three (3) sizes of cavities 200, in the plan view of the mold 110.

The cavities include five (5) square block cavities (for brevity, SBCs), generally referenced as 210, including first through fifth SBCs 210A-210E, four of which are around the perimeter 180 and one is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view, defining a first cavity area. The value of the length L as referenced in each of the cavities 200 and blocks 120 is the same as each other.

The cavities 200 form five (5) small (or first) rectangular block cavities (for brevity, small-block cavities or SRBCs), generally referenced as 230, including first through fifth SRBCs 230A-230E, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second cavity area that is smaller than the first cavity area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 1A, the second through fourth SRBCs 230B-230D correspond with first through third Long-SRBCs 232A-232C. The first and fifth SRBCs 230A, 230E correspond with the first and second Lat-SRBCs 234A-234B.

The cavities 200 form three (3) large (or second) rectangular block cavities (for brevity, large-block cavities or LRBCs), generally referenced as 250, including first through third LRBCs 250A-250C, two of which are along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as either longitudinally extending or laterally extending. A longitudinally extending LRBC (for brevity, a Long-LRBC) 252 is an LRBC 250 with its long side 251A extending in the longitudinal direction L1. A laterally extending LRBC (for brevity, a Lat-LRBC) 254 is a LRBC with its long side 251A extending in the lateral direction L2. As shown in FIG. 1A, the second and third LRBCs 250B, 250C correspond with first and second Long-LRBCs 252A, 252B and the first LRBC 250A corresponds with a first Lat-LRBC 254A.

Along the first end 150A of the mold 110, from the first side 160A to the second side 160B, the cavities 200 are arranged to provide the first Lat-SRBC 234A, the first Long-SRBC 232A, the first and second SBCs 210A, 210B, and the second Long-SRBC 232B. Along the second end 150B of the mold 110, from the second side 160B to the first side 160A, the cavities 200 are arranged to provide the first Lat-LBRC 254A, the third Long-SRBC 232C, the second Lat-SRBC 234B, and the first Long-LRBC 252A.

The third SBC 210C is against the second side 160B, between the second Long-SRBC 232B and the first Lat-LRBC 254A. The fourth SBC 210D is against the first side 160A, between the first Lat-SRBC 234A and the first Long-LRBC 252A. The fifth SBC 210E is internal and is laterally against the third SBC 210C. The second Long-LRBC 252B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275, e.g., where walls of any three block cavities intersect, define Ts.

Turning to FIG. 1B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 1B, the perimeter 380 of the layer 130, e.g., in the plan view, is rectangular. The distance LID between the ends 350A, 350B of the layer 130 is smaller than the distance L2D between the sides 360A, 360B by a ratio of three by four (3×4), i.e., forming an aspect ratio of 4×3. The layer 310 extends heightwise from a bottom 370A, which is positioned against a ground, to a top 370B to define a block height BH.

With reference to FIG. 1B, there are three (3) sizes of blocks 120, in the plan view in the layer 130. The layer 130 includes five (5) square blocks (for brevity, SBs), generally referenced as 410, including first through fifth SB4s 410A-410E, four of which are around the perimeter 180 and one is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has five (5) small (or first) rectangular blocks (for brevity, small-blocks or SRBs), generally referenced as 430, including first through fifth SRBs 430A-430E, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 1B, the second through fourth SRBs 430B-430D correspond with first through third Long-SRBs 432A-432C and the first and fifth SRBs 430A, 430E correspond with the first and second Lat-SRBs 434A-434B.

The layer 130 has three (3) large (or second) rectangular blocks (for brevity, large-blocks or LRBs), generally referenced as 450, including first through third LRBs 450A-450C, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as either longitudinally extending or laterally extending. A longitudinally extending LRB (for brevity, a Long-LRB) 452 is an LRB 450 with its long side 451A extending in the longitudinal direction L1. A laterally extending LRB (for brevity, a Lat-LRB) 454 is a LRB with its long side 451A extending in the lateral direction L2. As shown in FIG. 1B, the second and third LRBs 450B, 450C correspond with first and second Long-LRBs 452A, 452B and the first LRB 450C corresponds with a first Lat-LRB 454A.

Along the first end 350A of the layer 130, from the first side 360A to the second side 360B, the blocks 120 are arranged to provide the first Lat-SRB 434A, the first Long-SRB 432A, the first and second SBs 410A, 410B, and the second Long-SRB 432B. Along the second end 350B of the layer 130, from the second side 360B to the first side 360A, the blocks 120 are arranged to provide the first Lat-LRB 434A, the third Long-SRB 432C, the second Lat-SRB 434B, and the first Long-LRB 452A.

The third SB 410C is against the second side 360B, between the second Long-SRB 432B and the first Lat-LRB 454A. The fourth SB 410D is against the first side 360A, between the first Lat-SRB 434A and the first Long-LRB 452A. The fifth SB 410E is internal and is laterally against the third SB 410C. The second Long-LRB 452B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475, e.g., where sides of any three blocks intersect within the layer 130, define Ts.

The above mold 110 provides joints between block cavities that are X-less, i.e., the joints define Ts. As such, the layer 130 provides blocks 120 that are arranged in an X-less joint configuration.

Figure 1D:
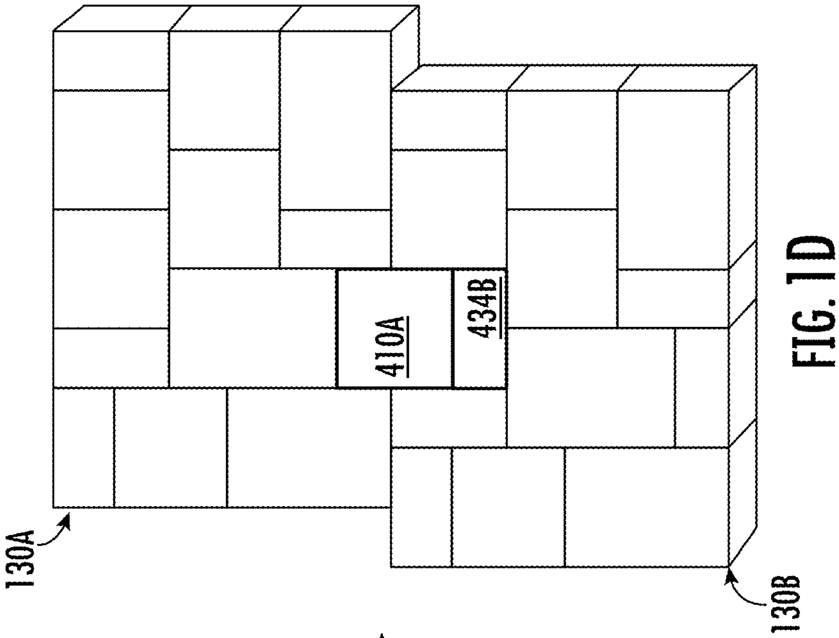
FIG. 1D shows the two layers of blocks configured with an X-less joint pattern.
Figure 1C:
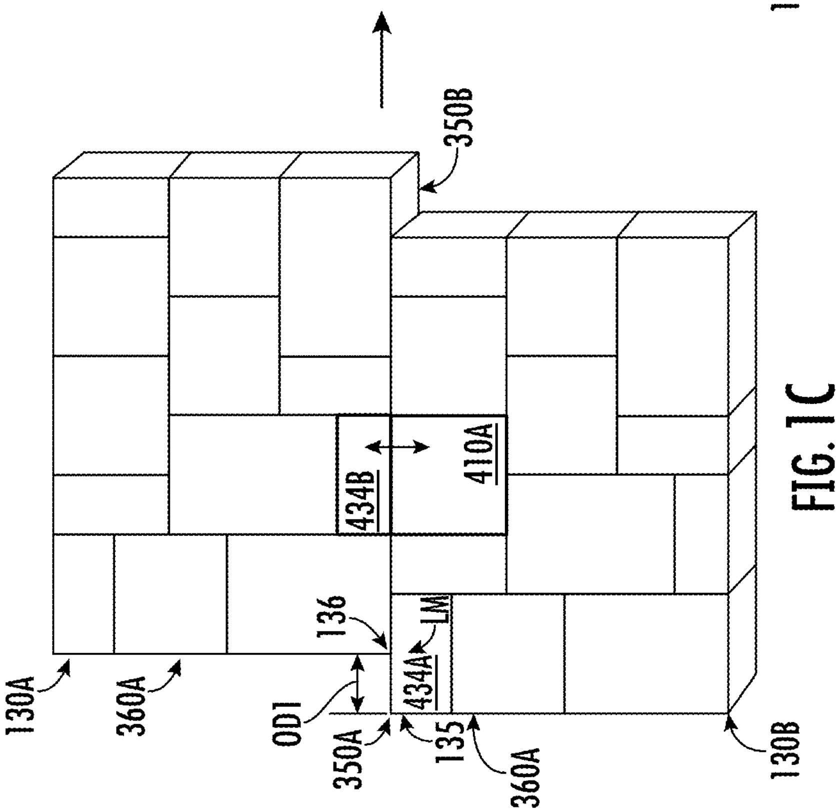
FIG. 1C shows two layers of blocks formed by the mold of FIG. 1A disposed longitudinally against each other and laterally offset from each other.
Figure 1E:
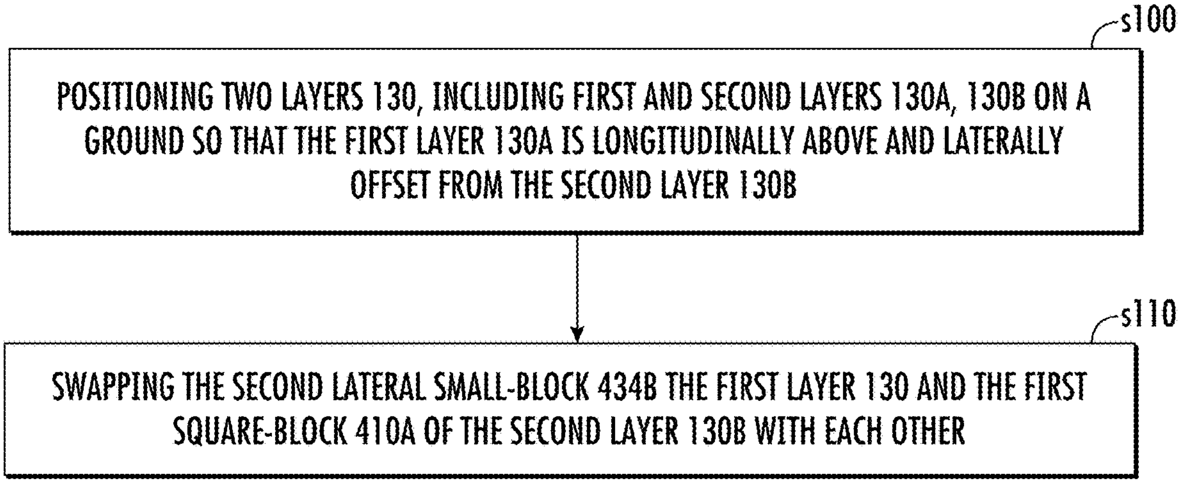
FIG. 1E is a flowchart showing a method of manipulating one block from each of the two layers of blocks shown in FIG. 1D to provide the X-less joint pattern.

Turning to FIGS. 1C-1E, the figures show a method of laying two layers 130A, 130B of the type shown in FIG. 1B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. With this configuration, the second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 1D. For example, the joints, e.g., where sides of any three blocks intersect, within and between the first and second layers, define Ts.

Figure 1F:
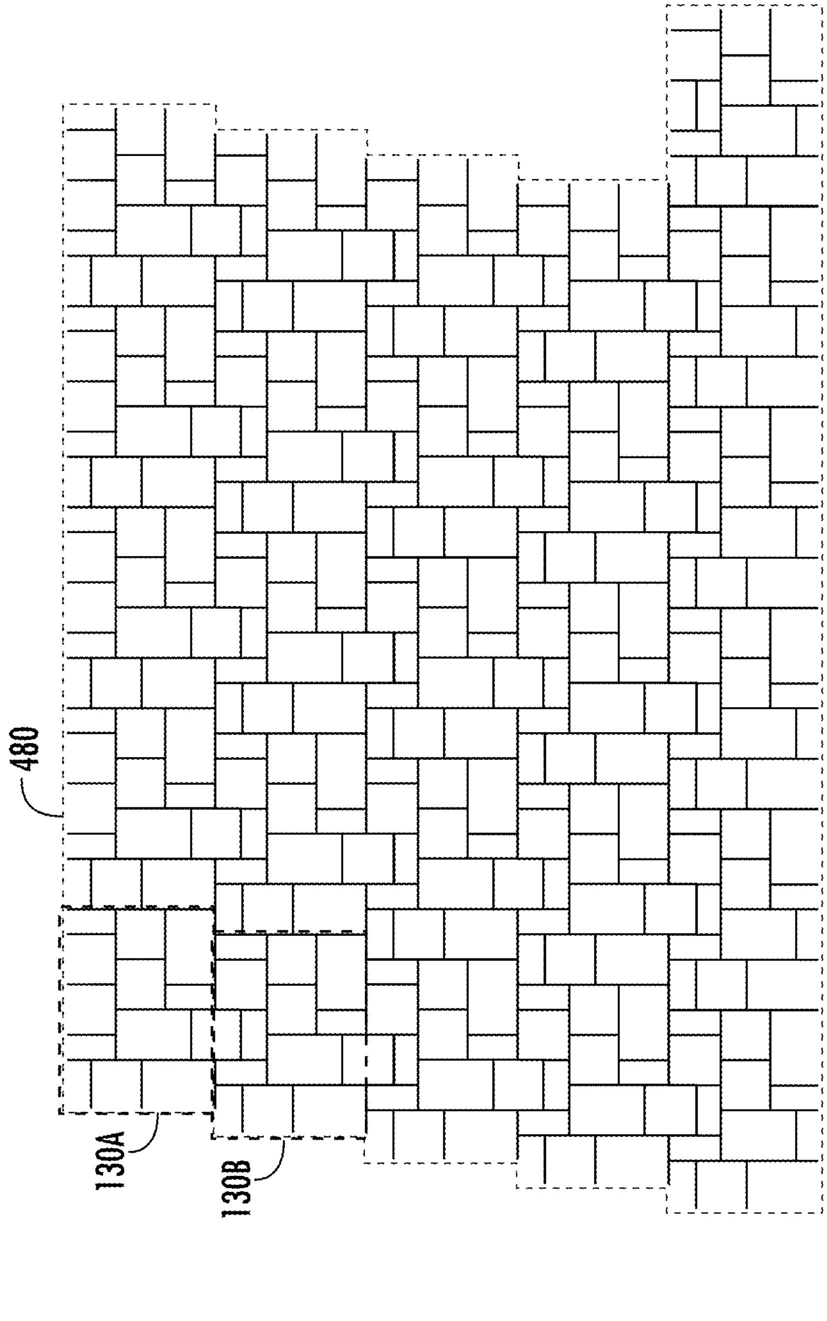
FIG. 1F is a build-out cluster of the layers of FIG. 1B, where longitudinally adjacent ones of the layers are manipulated to provide the X-less joint pattern.

FIG. 1F shows an array 480 of layers 130 of FIG. 1B built-out from the first and second layers 130A, 130B. The array 480 of layers 130 may be laid out over a driveway, roadway, patio, parking lot, park, or any area where pedestrians or automobiles may be located, stationary or moving, indoor or outdoor, as non-limiting examples. The same block swapping of FIG. 1E occurs which each longitudinally adjacent ones of the layers 130 to provide an X-less joint pattern throughout the array 480. For example, the joints, e.g., where sides of any three blocks intersect, throughout the array 480, define Ts.

Figure 2A:
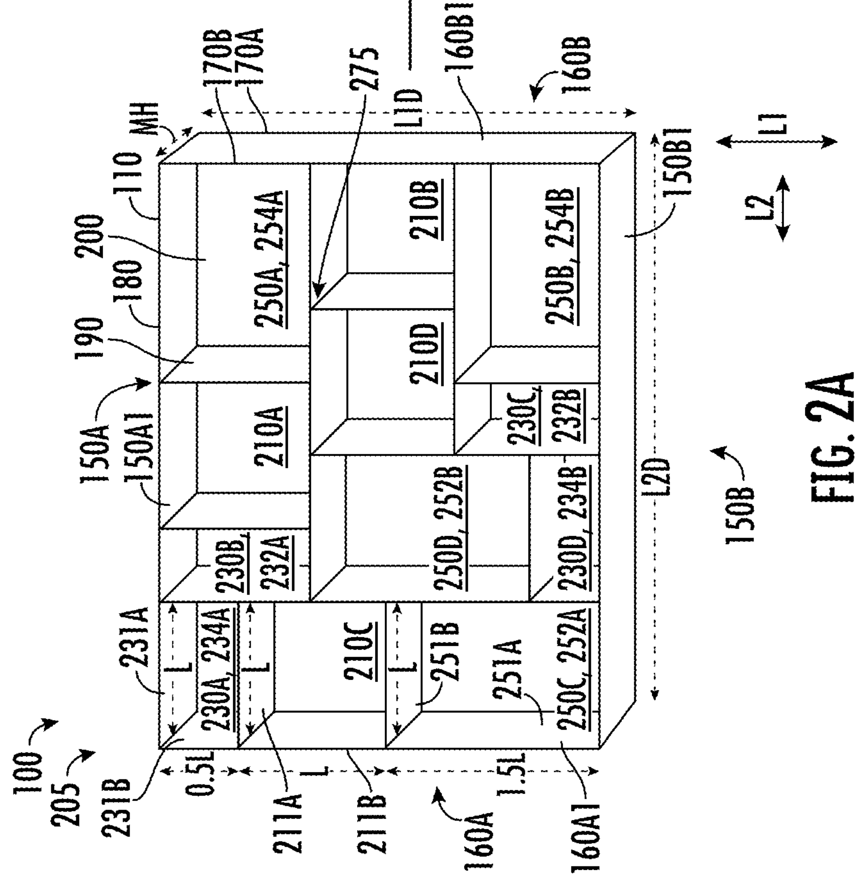
FIG. 2A shows a top plan view of a mold for fabricating paver blocks according to a second embodiment.

Turning to FIG. 2A, the figure shows another system 100 for providing a paver block configuration with X-less joints.

More specifically, FIG. 2A shows a top plan view of a mold 110 for fabricating paver blocks (or blocks) 120 in a paver block layer 130 shown in FIG. 2B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance LID, and in a second direction, laterally L2, between first and second sides 160A, 160B to side walls 160A1, 160A2 by a lateral distance L2D.

As shown in FIG. 2A, the perimeter (or outer boundary) 180 of the mold 110, e.g., in a plan view, is rectangular. The distance LID between the ends 150A, 150B of the mold 110 is smaller than the distance L2D between the sides 160A, 160B by a ratio of three by four (3×4), i.e., forming an aspect ratio of 4×3. The mold 110 extends heightwise from a bottom 170A to a top 170B to define a mold height MH.

With reference to FIG. 2A, the mold 110 has internal partition walls 190 that divide the mold 110 into cavities 200 that form the blocks 120. There are three (3) sizes of cavities 200, in the plan view of the mold 110.

The cavities include four (4) square block cavities (for brevity, SBCs), generally referenced as 210, including first through fourth SBCs 210A-210D, three of which are around the perimeter 180 and one is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view and define a first cavity area.

The value of the length L as referenced in each of the cavities 200 and blocks 120 is the same as each other.

The cavities 200 form four (4) small (or first) rectangular block cavities (for brevity, small-block cavities or SRBCs), generally referenced as 230, including first through fourth SRBCs 230A-230D, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second cavity area that is smaller than the first cavity area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 2A, the second and third SRBCs 230B-230C correspond with first and second Long-SRBCs 232A-232B. The first and fourth SRBCs 230A, 230D correspond with the first and second Lat-SRBCs 234A-234B.

The cavities 200 form four (4) large (or second) rectangular block cavities (for brevity, large-block cavities or LRBCs), generally referenced as 250, including first through fourth LRBCs 250A-250D, three of which are along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as either longitudinally extending or laterally extending. A longitudinally extending LRBC (for brevity, a Long-LRBC) 252 is an LRBC 250 with its long side 251A extending in the longitudinal direction L1. A laterally extending LRBC (for brevity, a Lat-LRBC) 254 is a LRBC with its long side 251A extending in the lateral direction L2. As shown in FIG. 2A, the third and fourth LRBCs 250C, 250D correspond with first and second Long-LRBCs 252A, 252B and the first and second LRBCs 250A, 250B correspond with first and second Lat-LRBC 254A, 254B.

Along the first end 150A of the mold 110, from the first side 160A to the second side 160B, the cavities 200 are arranged to provide the first Lat-SRBC 234A, the first Long-SRBC 232A, the first SBC 210A, and the first Lat-LRBC 254B. Along the second end 150B of the mold 110, from the second side 160B to the first side 160A, the cavities 200 are arranged to provide the second Lat-LBRC 254B, the second Long-SRBC 232B, the second Lat-SRBC 234B, and the first Long-LRBC 252A.

The second SBC 210B is against the second side 160B, between the first and second Lat-LRBCs 254A, 254B. The third SBC 210C is against the first side 160A, between the first Lat-SRBC 234A and the first Long-LRBC 252A. The fourth SBC 210D is internal and is laterally against the second SBC 210B. The second Long-LRBC 252B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275 define Ts.

Turning to FIG. 2B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 2B, the perimeter 380 of the layer 130, e.g., in the plan view, is rectangular. The distance LID between the ends 350A, 350B of the layer 130 is smaller than the distance L2D between the sides 360A, 360B by a ratio of three by four (3×4), i.e., forming an aspect ratio of 4×3. The layer 310 extends heightwise from a bottom 370A, which is positioned against a ground, to a top 370B to define a block height BH.

With reference to FIG. 2B, there are three (3) sizes of blocks 120, in the plan view in the layer 130.

The layer 130 includes four (4) square blocks (for brevity, SBs), generally referenced as 410, including first through fourth SB4s 410A-410D three of which are around the perimeter 180 and one is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has four (4) small (or first) rectangular blocks (for brevity, small-blocks or SRBs), generally referenced as 430, including first through fourth SRBs 430A-430D, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 2B, the second and third SRBs 430B-430C correspond with first and second Long-SRBs 432A-432B and the first and fourth SRBs 430A, 430D correspond with the first and second Lat-SRBs 434A-434B.

The layer 130 has four (4) large (or second) rectangular blocks (for brevity, large-blocks or LRBs), generally referenced as 450, including first through fourth LRBs 450A-450D, three of which are along the perimeter 180 and one is internal, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as either longitudinally extending or laterally extending. A longitudinally extending LRB (for brevity, a Long-LRB) 452 is an LRB 450 with its long side 451A extending in the longitudinal direction L1. A laterally extending LRB (for brevity, a Lat-LRB) 454 is a LRB with its long side 451A extending in the lateral direction L2. As shown in FIG. 2B, the third and fourth LRBs 450C, 450D correspond with first and second Long-LRBs 452A, 452B and the first and second LRBs 450A, 450B correspond with the first and second Lat-LRBs 454A, 454B.

Along the first end 350A of the layer 130, from the first side 360A to the second side 360B, the blocks 120 are arranged to provide the first Lat-SRB 434A, the first Long-SRB 432A, the first SB 410A, and the first Lat-LRB 454A. Along the second end 350B of the layer 130, from the second side 360B to the first side 360A, the blocks 120 are arranged to provide the second Lat-LRB 454B, the second Long-SRB 432B, the second Lat-SRB 434B, and the first Long-LRB 452A.

The second SB 410B is against the second side 360B, between the first and second Lat-LRB 454A, 454B. The third SB 410C is against the first side 360A, between the first Lat-SRB 434A and the first Long-LRB 452A. The fourth SB 410D is internal and is laterally against the second SB 410B. The second Long-LRB 452B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475 define Ts.

The above mold 110 provides joints between block cavities that are X-less, i.e., the joints define Ts. As such, the layer 130 provides blocks 120 that are arranged in an X-less joint configuration.

Figure 2D:
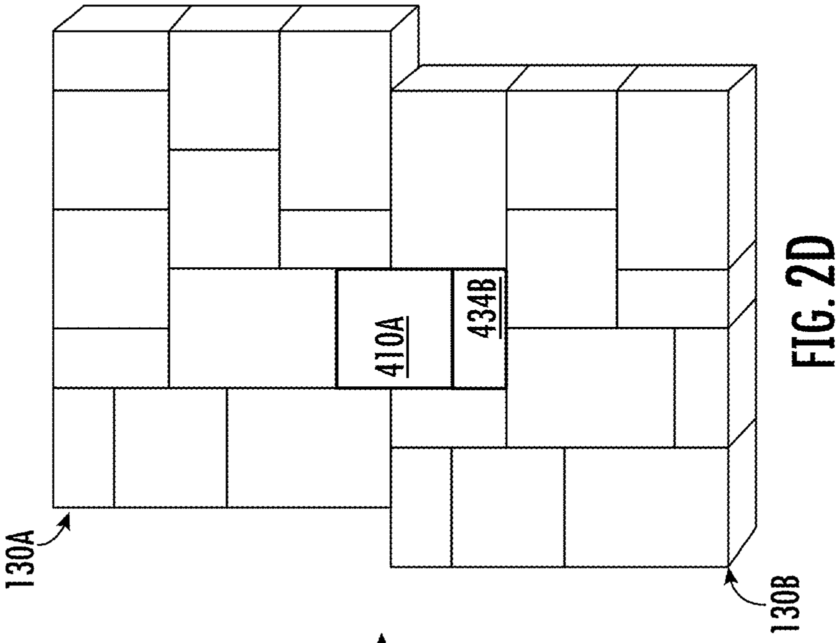
FIG. 2D shows the two layers of blocks configured with an X-less joint pattern.
Figure 2C:
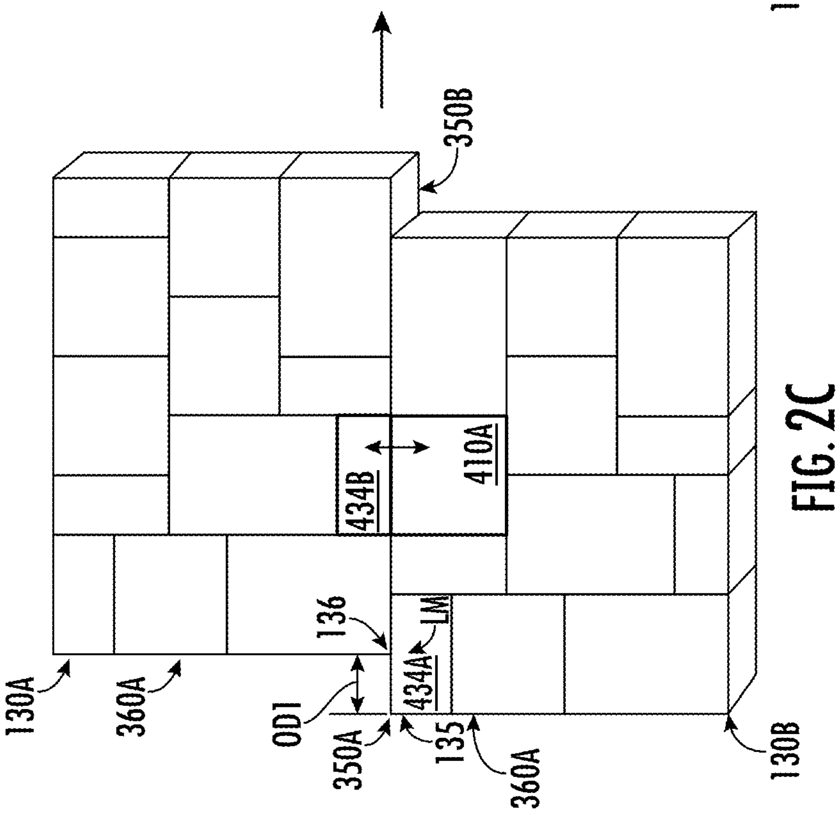
FIG. 2C shows two layers of blocks formed by the mold of FIG. 2A disposed longitudinally against each other and laterally offset from each other.
Figure 2E:
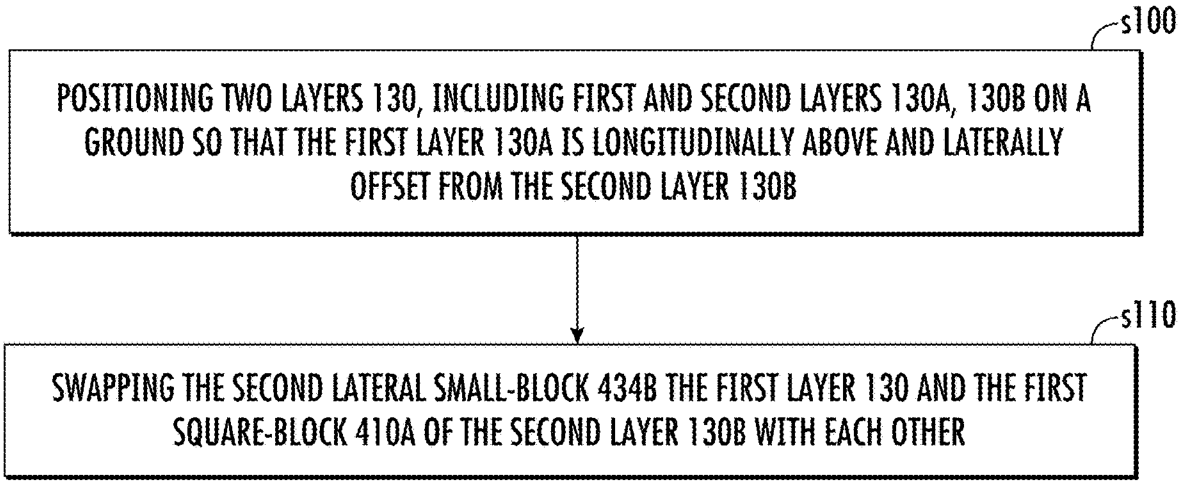
FIG. 2E is a flowchart showing a method of manipulating one block from each of the two layers of blocks shown in FIG. 2D to provide the X-less joint pattern.

Turning to FIGS. 2C-2E, the figures show a method of laying two layers 130A, 130B of the type shown in FIG. 2B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. The second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 2D.

Figure 2F:
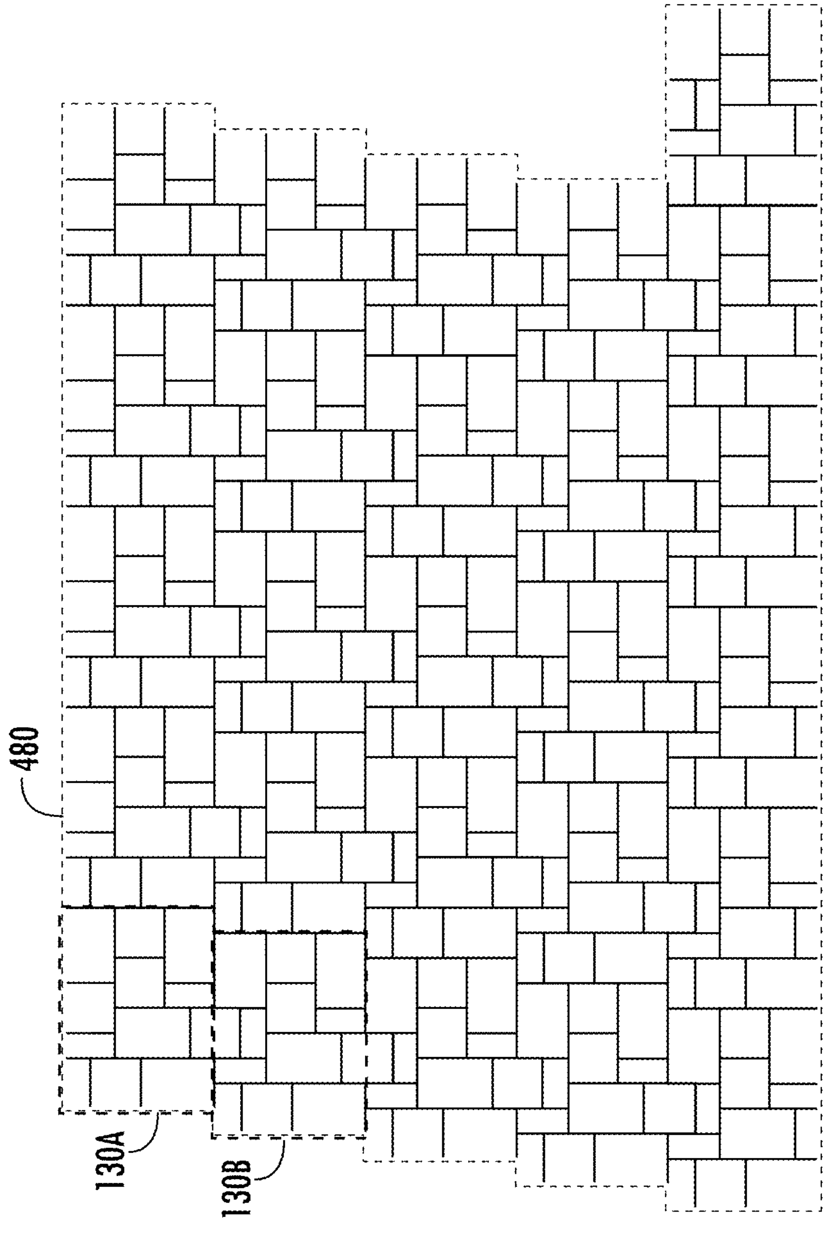
FIG. 2F is a build-out cluster of the layers of FIG. 2B, where longitudinally adjacent ones of the layers are manipulated to provide the X-less joint pattern.

FIG. 2F shows an array 480 of layers 130 of FIG. 2B built-out from the first and second layers 130A, 130B. The array 480 of layers 130 may be laid out over a driveway, roadway, patio, parking lot, park, or any area where pedestrians or automobiles may be located, stationary or moving, indoor or outdoor. The same block swapping of FIG. 2E occurs which each longitudinally adjacent ones of the layers 130 to provide an X-less joint pattern throughout the array 480.

Figure 3B:
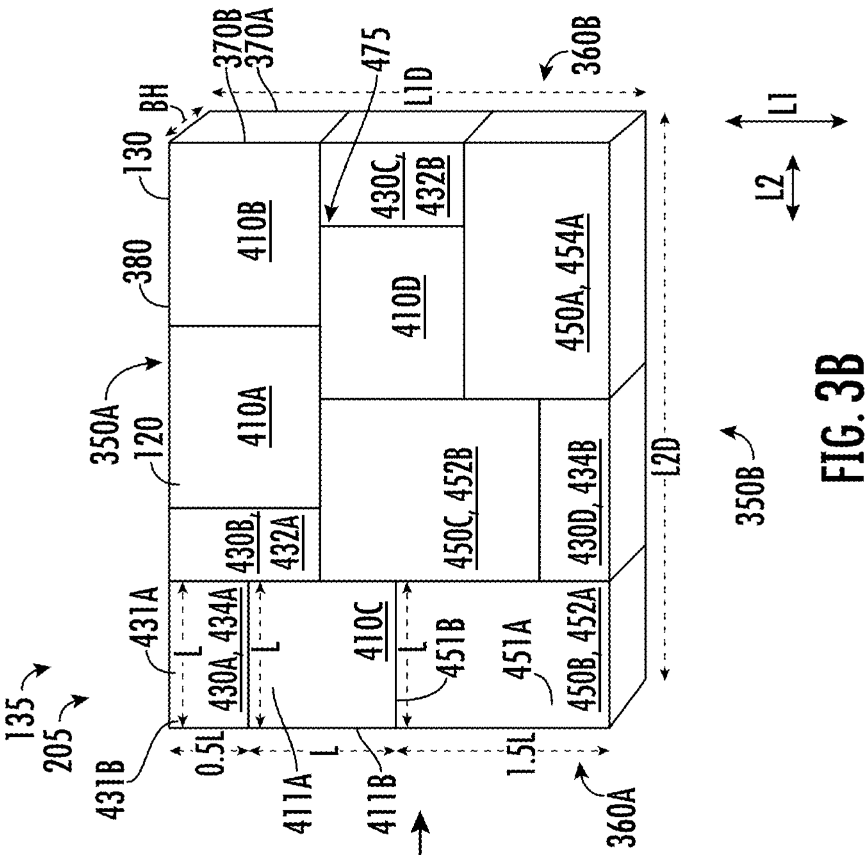
FIG. 3B shows a layer of blocks formed by the mold of FIG. 3A.
Figure 3A:
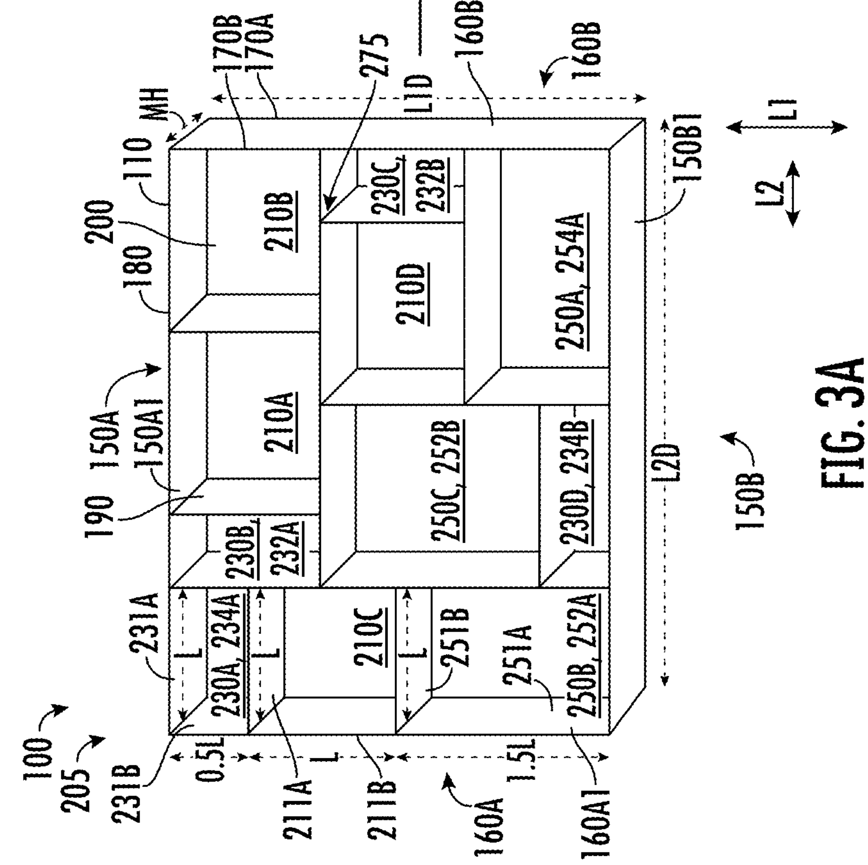
FIG. 3A shows a top plan view of a mold for fabricating paver blocks according to a third embodiment.

Turning to FIG. 3A, the figure shows another system 100 for providing a paver block configuration with X-less joints.

More specifically, FIG. 3A shows a top plan view of a mold 110 for fabricating paver blocks (or blocks) 120 in a paver block layer 130 shown in FIG. 3B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance LID, and in a second direction, laterally L2, between first and second sides 160A, 160B to side walls 160A1, 160A2 by a lateral distance L2D.

As shown in FIG. 3A, the perimeter (or outer boundary) 180 of the mold 110, e.g., in a plan view, is rectangular. The distance LID between the ends 150A, 150B of the mold 110 is smaller than the distance L2D between the sides 160A, 160B by a ratio of three to three and a half (3×3.5), i.e., forming an aspect ratio of 3.5×3. The mold 110 extends heightwise from a bottom 170A to a top 170B to define a mold height MH.

With reference to FIG. 3A, the mold 110 has internal partition walls 190 that divide the mold 110 into cavities 200 that form the blocks 120. There are three (3) sizes of cavities 200, in the plan view of the mold 110.

The cavities include four (4) square block cavities (for brevity, SBCs), generally referenced as 210, including first through fourth SBCs 210A-210D, three of which are around the perimeter 180 and one is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view and define a first cavity area.

The value of the length L as referenced in each of the cavities 200 and blocks 120 is the same as each other.

The cavities 200 form four (4) small (or first) rectangular block (cavities (for brevity, small-block cavities or SRBCs), generally referenced as 230, including first through fourth SRBCs 230A-230D, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second block area that is smaller than the first block area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 3A, the second and third SRBCs 230B-230C correspond with first and second Long-SRBCs 232A-232B. The first and fourth SRBCs 230A, 230D correspond with the first and second Lat-SRBCs 234A-234B.

The cavities 200 form three (3) large (or second) rectangular block cavities (for brevity, large-block cavities or LRBCs), generally referenced as 250, including first through third LRBCs 250A-250C, two of which are along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as either longitudinally extending or laterally extending. A longitudinally extending LRBC (for brevity, a Long-LRBC) 252 is an LRBC 250 with its long side 251A extending in the longitudinal direction L1. A laterally extending LRBC (for brevity, a Lat-LRBC) 254 is a LRBC with its long side 251A extending in the lateral direction L2. As shown in FIG. 3A, the second and third LRBCs 250B, 250C correspond with first and second Long-LRBCs 252A, 252B and the first LRBC 250A corresponds with first Lat-LRBC 254A.

Along the first end 150A of the mold 110, from the first side 160A to the second side 160B, the cavities 200 are arranged to provide the first Lat-SRBC 234A, the first Long-SRBC 232A, and the first and second SBCs 210A, 210B. Along the second end 150B of the mold 110, from the second side 160B to the first side 160A, the cavities 200 are arranged to provide the first Lat-LBRC 254A, the second Lat-SRBC 234B, and the first Long-LRBC 252A.

The second Long-SRBC 232B is against the second side 160B, between the second SBC 210B and the first Lat-LRBC 254A. The third SBC 210C is against the first side 160A, between the first Lat-SRBC 234A and the first Long-LRBC 252A. The fourth SBC 210D is internal and is laterally against the second Long-SRBC 232B. The second Long-LRBC 252B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275 define Ts.

Turning to FIG. 3B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 3B, the perimeter 380 of the layer 130, e.g., in the plan view, is rectangular. The distance LID between the ends 350A, 350B of the layer 130 is smaller than the distance L2D between the sides 360A, 360B by a ratio of three by four (3×4), i.e., forming an aspect ratio of 4×3. The layer 310 extends heightwise from a bottom 370A, which is positioned against a ground, to a top 370B to define a block height BH.

With reference to FIG. 3B, there are three (3) sizes of blocks 120, in the plan view in the layer 130.

The layer 130 includes four (4) square blocks (for brevity, SBs), generally referenced as 410, including first through fourth SB4s 410A-410D three of which are around the perimeter 180 and one is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has four (4) small (or first) rectangular blocks (for brevity, small-blocks or SRBs), generally referenced as 430, including first through fourth SRBs 430A-430D, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 3B, the second and third SRBs 430B-430C correspond with first and second Long-SRBs 432A-432B and the first and fourth SRBs 430A, 430D correspond with the first and second Lat-SRBs 434A-434B.

The layer 130 has three (3) large (or second) rectangular blocks (for brevity, large-blocks or LRBs), generally referenced as 450, including first through third LRBs 450A-450C, two of which are along the perimeter 180 and one is internal, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as either longitudinally extending or laterally extending. A longitudinally extending LRB (for brevity, a Long-LRB) 452 is an LRB 450 with its long side 451A extending in the longitudinal direction L1. A laterally extending LRB (for brevity, a Lat-LRB) 454 is a LRB with its long side 451A extending in the lateral direction L2. As shown in FIG. 3B, the third and fourth LRBs 450C, 450D correspond with first and second Long-LRBs 452A, 452B and the first LRB 450A corresponds with the first Lat-LRB 454A.

Along the first end 350A of the layer 130, from the first side 360A to the second side 360B, the blocks 120 are arranged to provide the first Lat-SRB 434A, the first Long-SRB 432A, and the first and second SBs 410A, 410B. Along the second end 350B of the layer 130, from the second side 360B to the first side 360A, the blocks 120 are arranged to provide the first Lat-LRB 454A, the second Lat-SRB 434B, and the first Long-LRB 452A.

The second Long-SRB 432B is against the second side 360B, between the second SB 410B and the first Lat-LRB 454A. The third SB 410C is against the first side 360A, between the first Lat-SRB 434A and the first Long-LRB 452A. The fourth SB 410D is internal and is laterally against the second Long-SRB 432B. The second Long-LRB 452B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475 define Ts.

The above mold 110 provides joints between block cavities that are X-less, i.e., the joints define Ts. As such, the layer 130 provides blocks 120 that are arranged in an X-less joint configuration.

Figure 3D:
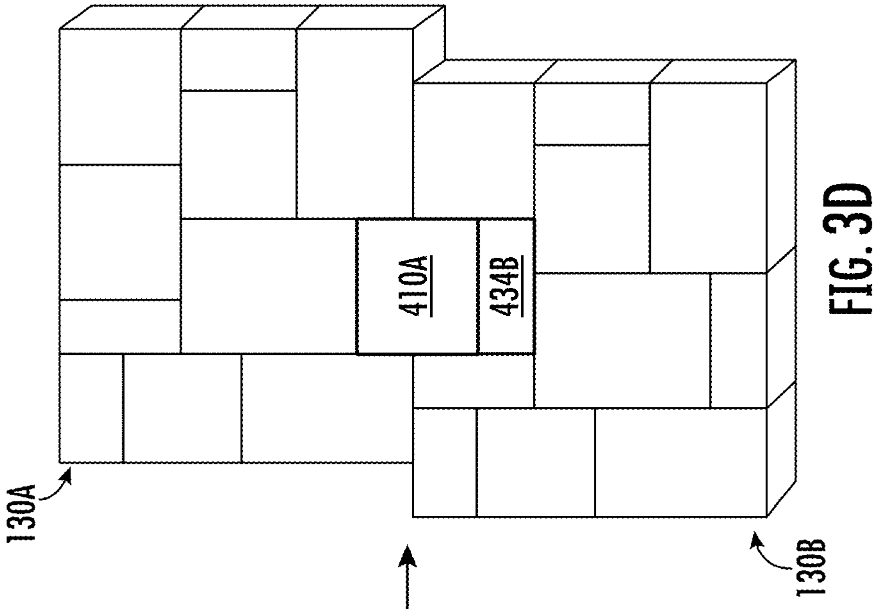
FIG. 3D shows the two layers of blocks configured with an X-less joint pattern.
Figure 3C:
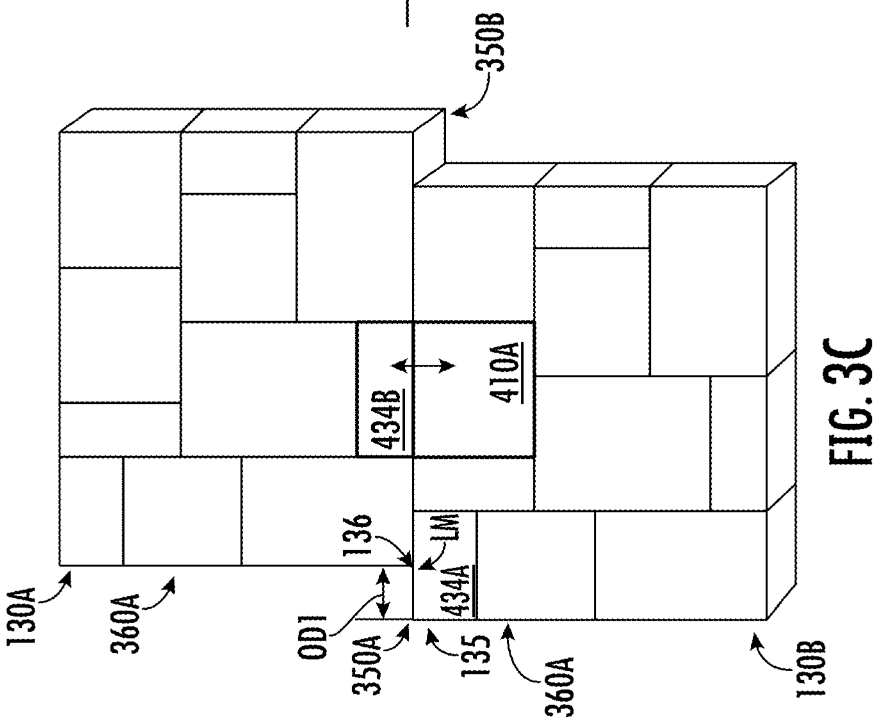
FIG. 3C shows two layers of blocks formed by the mold of FIG. 3A disposed longitudinally against each other and laterally offset from each other.

Turning to FIGS. 3C-3E, the figures show a method of laying two layers 130A, 130B of the type shown in FIG. 3B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. The second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 3D.

Figure 3F:
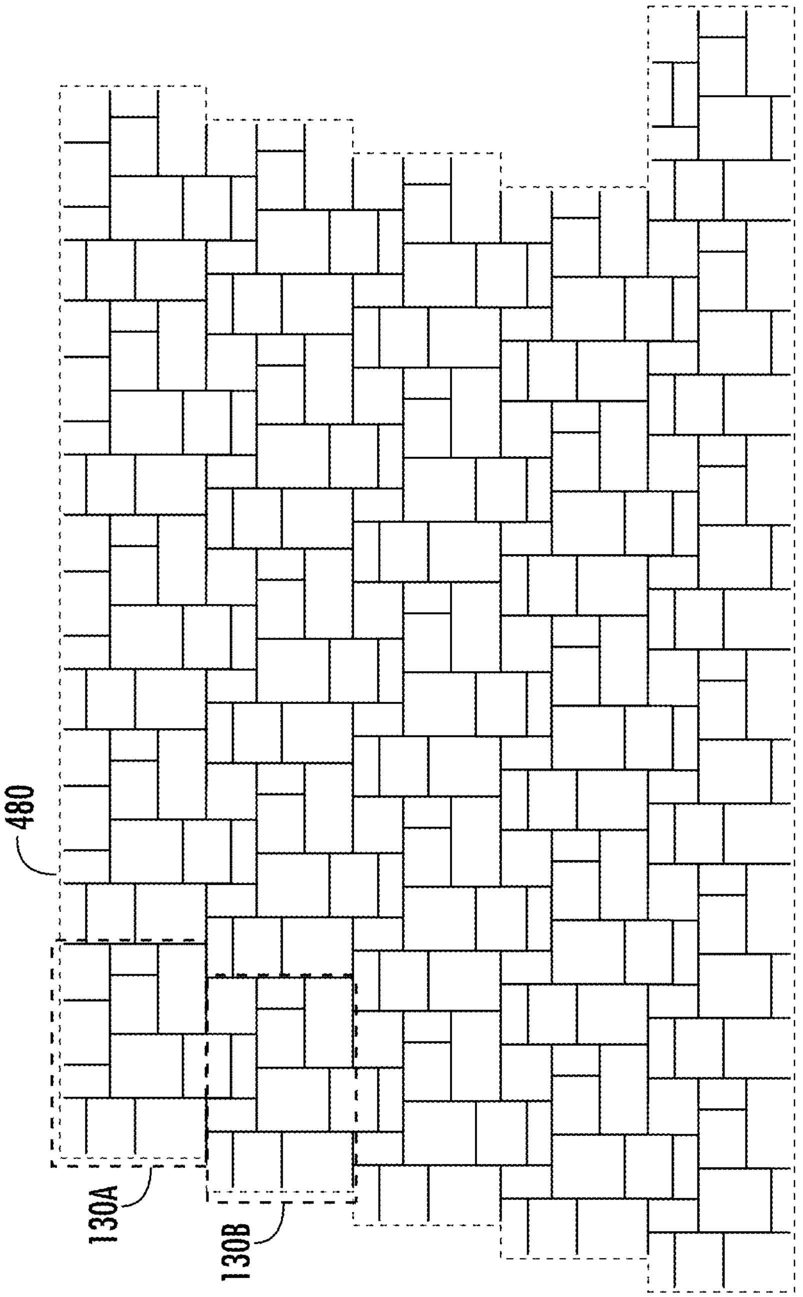
FIG. 3F is a build-out cluster of the layers of FIG. 3B, where longitudinally adjacent ones of the layers are manipulated to provide the X-less joint pattern.

FIG. 3F shows an array 480 of layers 130 of FIG. 3B built-out from the first and second layers 130A, 130B. The array 480 of layers 130 may be laid out over a driveway, roadway, patio, parking lot, park, or any area where pedestrians or automobiles may be located, stationary or moving, indoor or outdoor. The same block swapping of FIG. 3E occurs which each longitudinally adjacent ones of the layers 130 to provide an X-less joint pattern throughout the array 480.

Figure 4B:
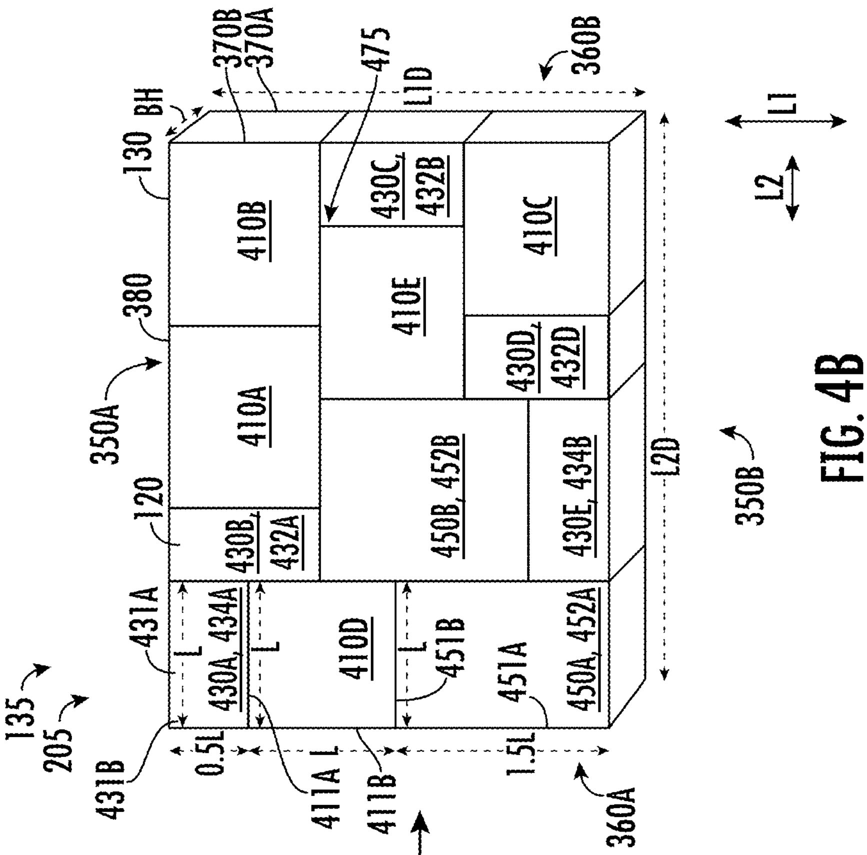
FIG. 4B shows a layer of blocks formed by the mold of FIG. 4A.
Figure 4A:
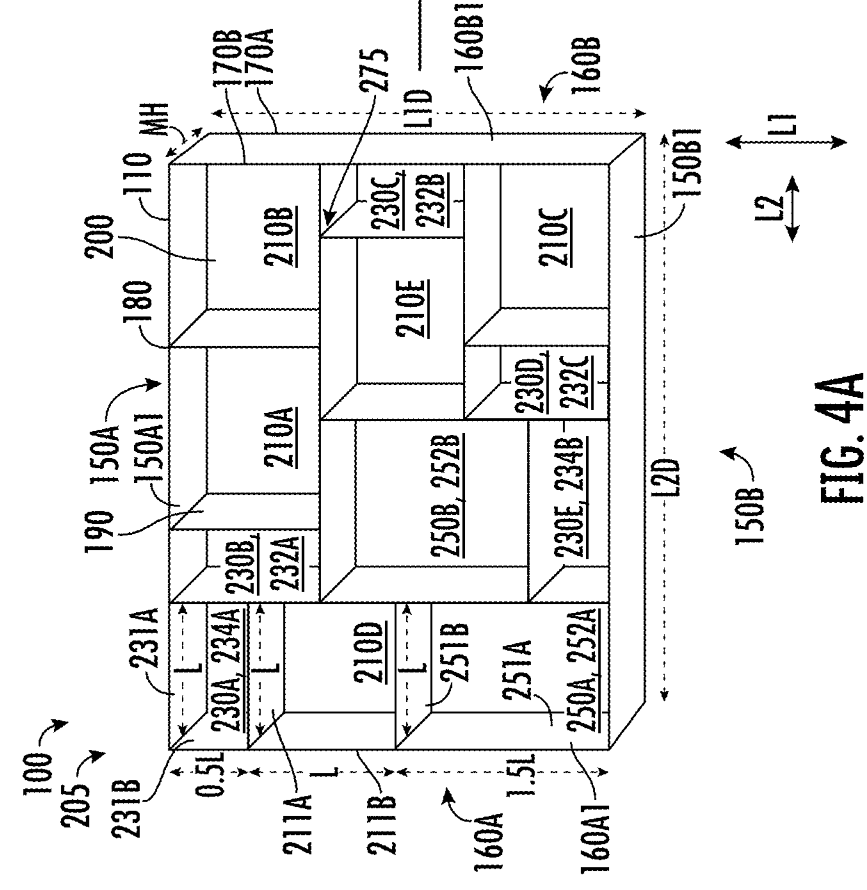
FIG. 4A shows a top plan view of a mold for fabricating paver blocks according to a fourth embodiment.

Turning to FIG. 4A, the figure shows another system 100 for providing a paver block configuration with X-less joints.

More specifically, FIG. 4A shows a top plan view of a mold 110 for fabricating paver blocks (or blocks) 120 in a paver block layer 130 shown in FIG. 4B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance L1D, and in a second direction, laterally L2, between first and second sides 160A, 160B to side walls 160A1, 160A2 by a lateral distance L2D.

As shown in FIG. 4A, the perimeter (or outer boundary) 180 of the mold 110, e.g., in a plan view, is rectangular. The distance LID between the ends 150A, 150B of the mold 110 is smaller than the distance L2D between the sides 160A, 160B by a ratio of three to three and a half (3×3.5), i.e., forming an aspect ratio of 3.5×3. The mold 110 extends height-wise from a bottom 170A to a top 170B to define a mold height MH.

With reference to FIG. 4A, the mold 110 has internal partition walls 190 that divide the mold 110 into cavities 200 that form the blocks 120. There are three (3) sizes of cavities 200, in the plan view of the mold 110.

The cavities include five (5) square block cavities (for brevity, SBCs), generally referenced as 210, including first through fifth SBCs 210A-210E, four of which are around the perimeter 180 and one is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view and define a first cavity area.

The value of the length L as referenced in each of the cavities 200 and blocks 120 is the same as each other.

The cavities 200 form five (5) small (or first) rectangular block cavities (for brevity, small-block cavities or SRBCs), generally referenced as 230, including first through fifth SRBCs 230A-230E, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second cavity area that is smaller than the first cavity area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 4A, the second through fourth SRBCs 230B-230D correspond with first through third Long-SRBCs 232A-232C. The first and fifth SRBCs 230A, 230E correspond with the first and second Lat-SRBCs 234A-234B.

The cavities 200 form two (2) large (or second) rectangular block cavities (for brevity, large-block cavities or LRBCs), generally referenced as 250, including first and second LRBCs 250A-250B, one of which is along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as either longitudinally extending or laterally extending. A longitudinally extending LRBC (for brevity, a Long-LRBC) 252 is an LRBC 250 with its long side 251A extending in the longitudinal direction L1. A laterally extending LRBC (for brevity, a Lat-LRBC) 254 is a LRBC with its long side 251A extending in the lateral direction L2. As shown in FIG. 4A, the first and second LRBCs 250A, 250B correspond with first and second Long-LRBCs 252A, 252B.

Along the first end 150A of the mold 110, from the first side 160A to the second side 160B, the cavities 200 are arranged to provide the first Lat-SRBC 234A, the first Long-SRBC 232A, and the first and second SBCs 210A, 210B. Along the second end 150B of the mold 110, from the second side 160B to the first side 160A, the cavities 200 are arranged to provide the third SBC 210C, the third Long-SBRC 232C, the second Lat-SRBC 234B, and the first Long-LRBC 252A.

The second Long-SRBC 232B is against the second side 160B, between the second and third SBCs 210B, 210C. The fourth SBC 210D is against the first side 160A, between the first Lat-SRBC 234A and the first Long-LRBC 252A. The fifth SBC 210E is internal and is laterally against the second Long-SRBC 232B. The second Long-LRBC 252B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275 define Ts.

Turning to FIG. 4B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 4B, the perimeter 380 of the layer 130, e.g., in the plan view, is rectangular. The distance LID between the ends 350A, 350B of the layer 130 is smaller than the distance L2D between the sides 360A, 360B by a ratio of three by four (3×4), i.e., having an aspect ratio of 4×3. The layer 310 extends heightwise from a bottom 370A, which is positioned against a ground, to a top 370B to define a block height BH.

With reference to FIG. 4B, there are three (3) sizes of blocks 120, in the plan view in the layer 130.

The layer 130 includes five (5) square blocks (for brevity, SBs), generally referenced as 410, including first through fifth SB4s 410A-410E, four of which are around the perimeter 180 and one is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has five (5) small (or first) rectangular blocks (for brevity, small-blocks or SRBs), generally referenced as 430, including first through fifth SRBs 430A-430E, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 4B, the second through fourth SRBs 430B-430D correspond with first through third Long-SRBs 432A-432C and the first and fifth SRBs 430A, 430E correspond with the first and second Lat-SRBs 434A-434B.

The layer 130 has two (2) large (or second) rectangular blocks (for brevity, large-blocks or LRBs), generally referenced as 450, including first and second LRBs 450A-450B, one of which is along the perimeter 180 and one is internal, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as either longitudinally extending or laterally extending. A longitudinally extending LRB (for brevity, a Long-LRB) 452 is an LRB 450 with its long side 451A extending in the longitudinal direction L1. A laterally extending LRB (for brevity, a Lat-LRB) 454 is a LRB with its long side 451A extending in the lateral direction L2. As shown in FIG. 4B, the first and second LRBs 450A, 450B correspond with first and second Long-LRBs 452A, 452B.

Along the first end 350A of the layer 130, from the first side 360A to the second side 360B, the blocks 120 are arranged to provide the first Lat-SRB 434A, the first Long-SRB 432A, and the first and second SBs 410A, 410B. Along the second end 350B of the layer 130, from the second side 360B to the first side 360A, the blocks 120 are arranged to provide the third SB 210C, the third Long-SRB 432C, the second Lat-SRB 434B, and the first Long-LRB 452A.

The second Long-SRB 432B is against the second side 360B, between the second and third SBs 410B, 410C. The fourth SB 410D is against the first side 360A, between the first Lat-SRB 434A and the first Long-LRB 452A. The fifth SB 410E is internal and is laterally against the second Long-SRB 432B. The second Long-LRB 452B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475 define Ts.

The above mold 110 provides joints between block cavities that are X-less, i.e., the joints define Ts. As such, the layer 130 provides blocks 120 that are arranged in an X-less joint configuration.

Figure 4D:
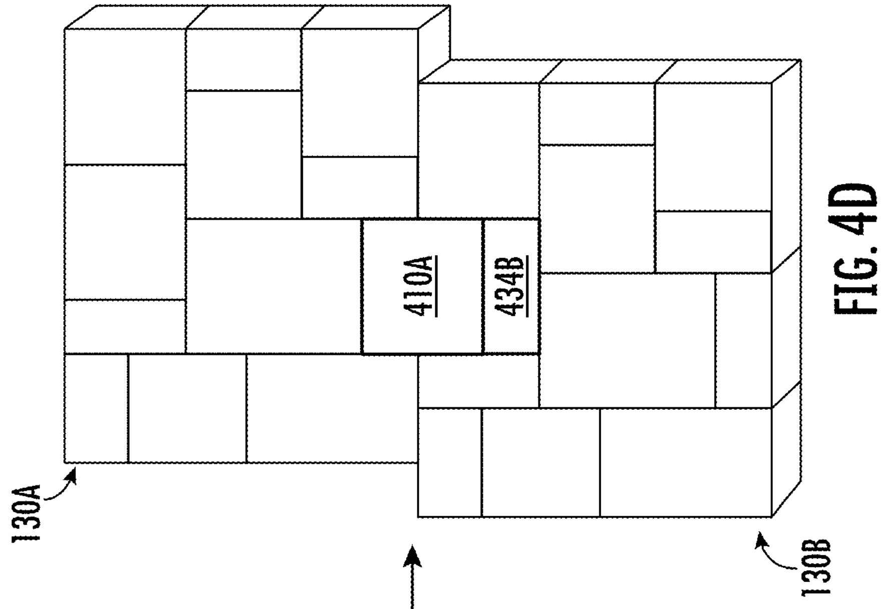
FIG. 4D shows the two layers of blocks configured with an X-less joint pattern.
Figure 4C:
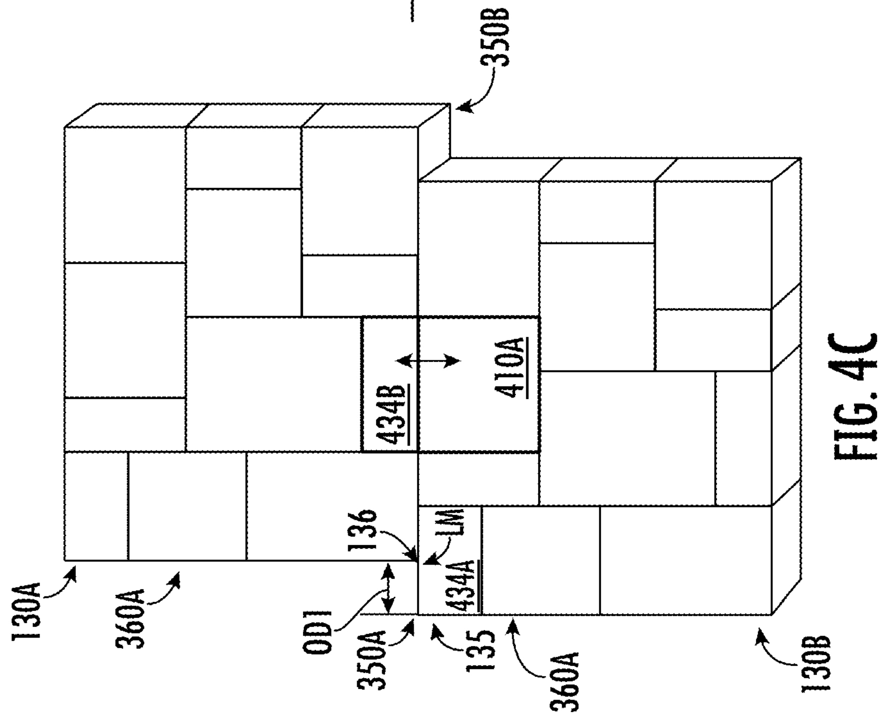
FIG. 4C shows two layers of blocks formed by the mold of FIG. 4A disposed longitudinally against each other and laterally offset from each other.
Figure 4E:
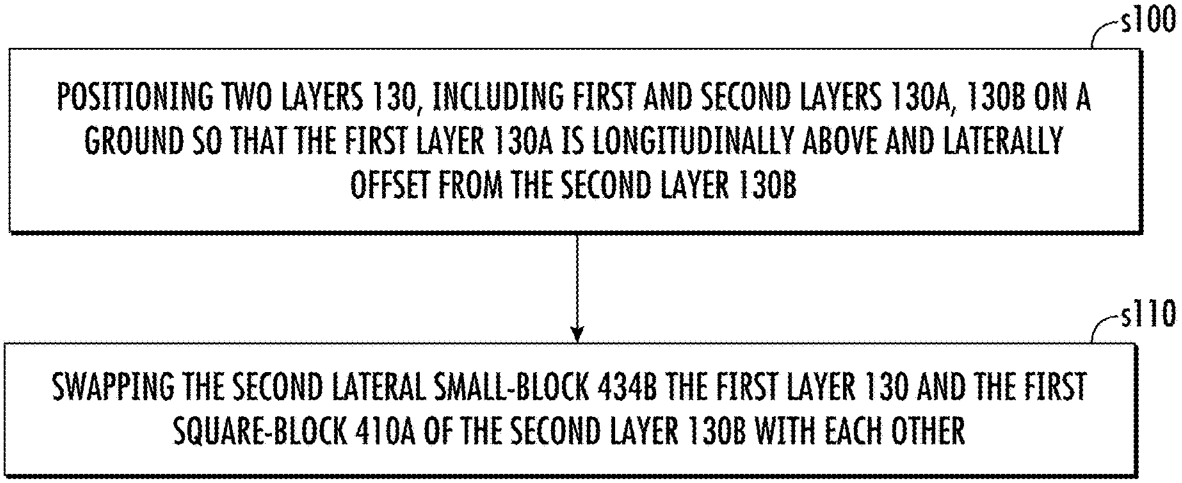
FIG. 4E is a flowchart showing a method of manipulating one block from each of the two layers of blocks shown in FIG. 4D to provide the X-less joint pattern.

Turning to FIGS. 4C-4E, the figures show a method of laying two layers 130A, 130B of the type shown in FIG. 4B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. The second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 4D.

Figure 4F:
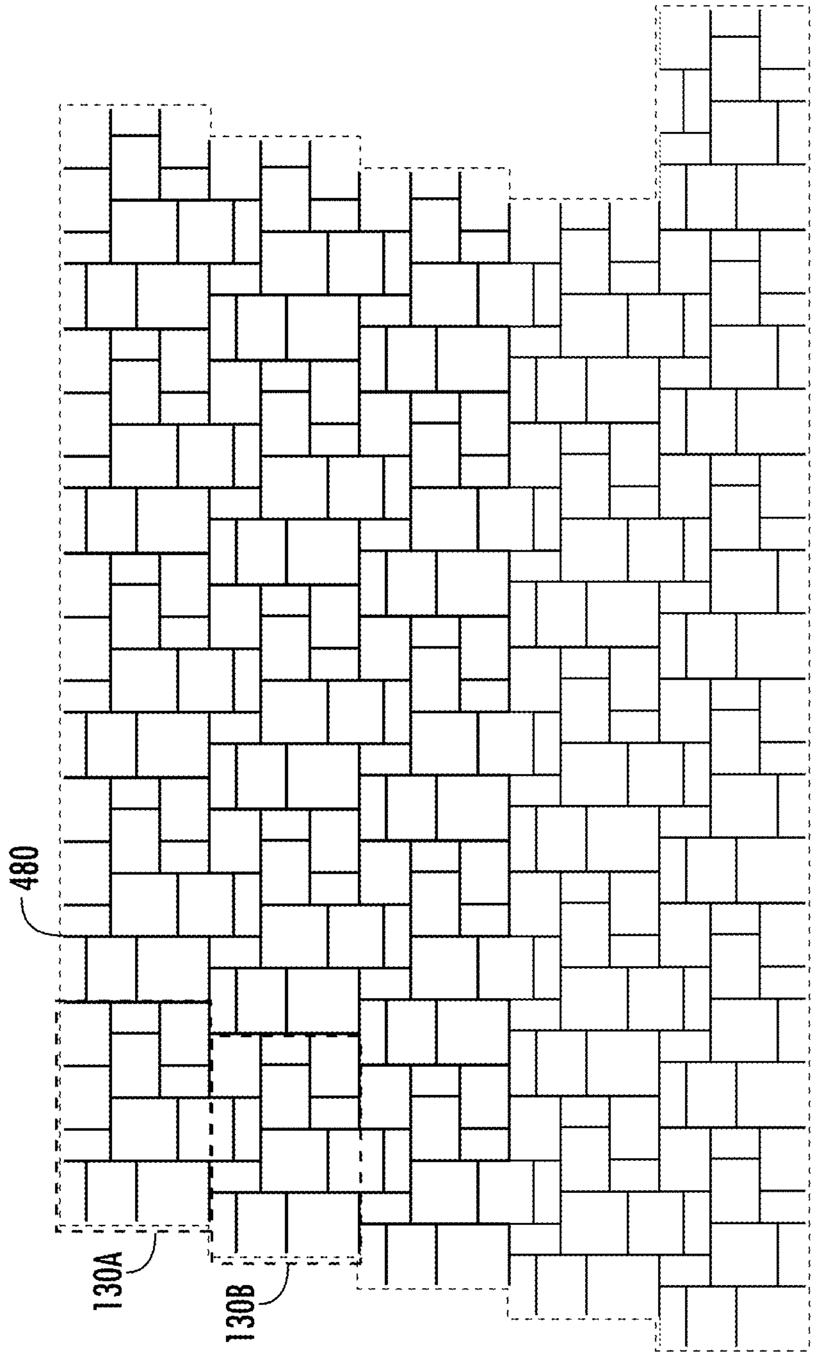
FIG. 4F is a build-out cluster of the layers of FIG. 4B, where longitudinally adjacent ones of the layers are manipulated to provide the X-less joint pattern.

FIG. 4F shows an array 480 of layers 130 of FIG. 4B built-out from the first and second layers 130A, 130B. The array 480 of layers 130 may be laid out over a driveway, roadway, patio, parking lot, park, or any area where pedestrians or automobiles may be located, stationary or moving, indoor or outdoor. The same block swapping of FIG. 4E occurs which each longitudinally adjacent ones of the layers 130 to provide an X-less joint pattern throughout the array 480.

Figure 5B:
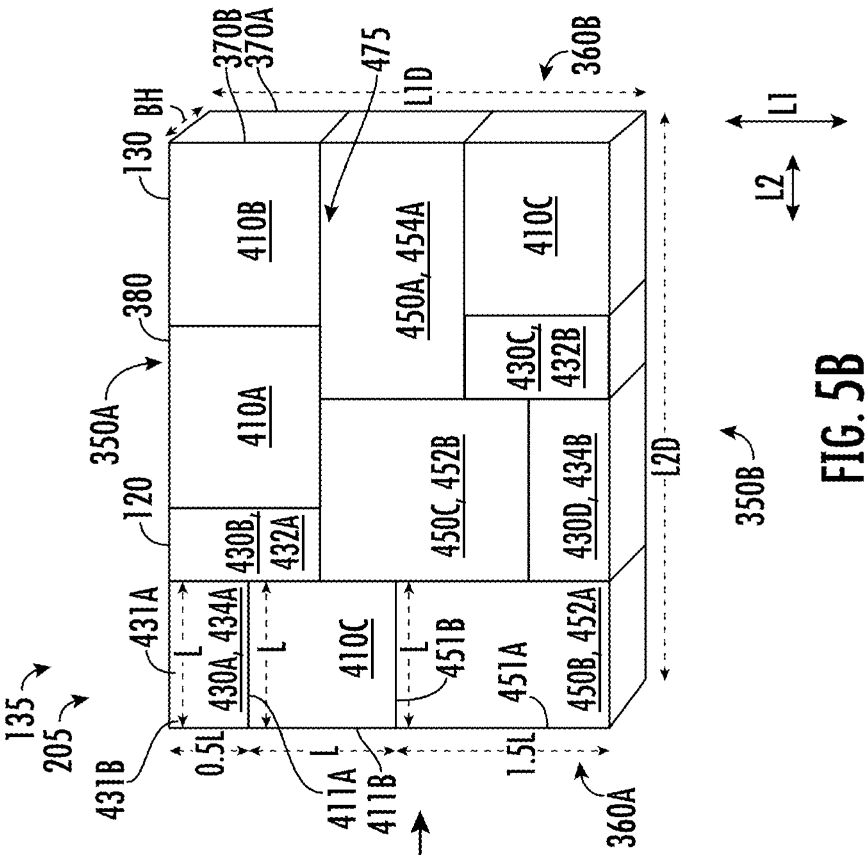
FIG. 5B shows a layer of blocks formed by the mold of FIG. 5A.
Figure 5A:
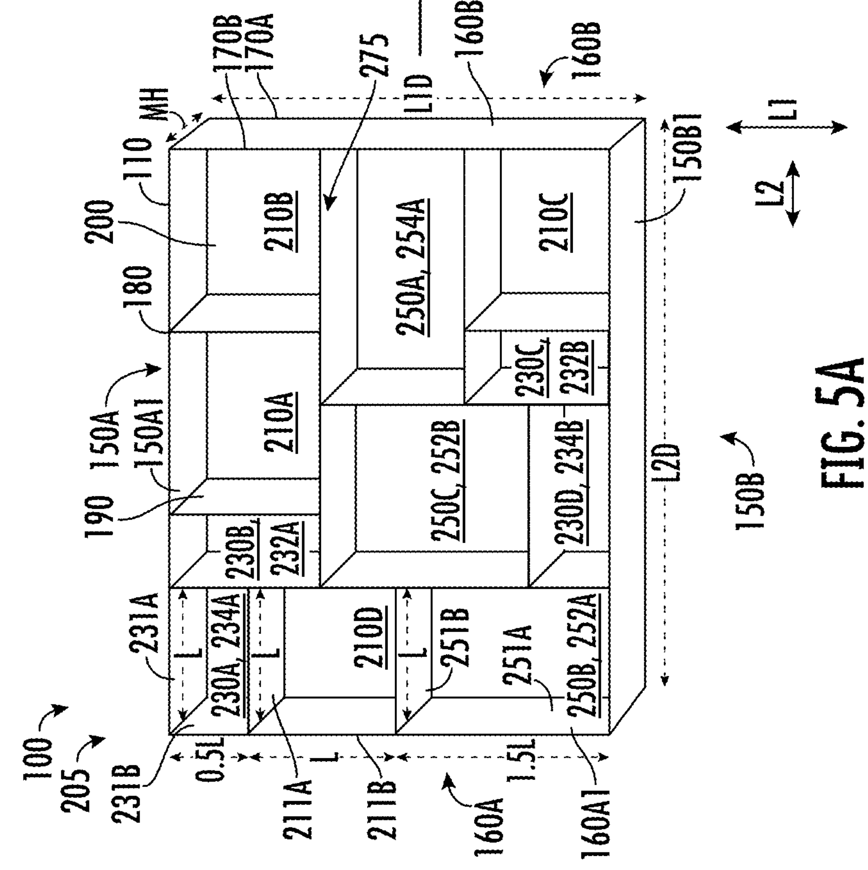
FIG. 5A shows a top plan view of a mold for fabricating paver blocks according to a fifth embodiment.

Turning to FIG. 5A, the figure shows another system 100 for providing a paver block configuration with X-less joints.

More specifically, FIG. 5A shows a top plan view of a mold 110 for fabricating paver blocks (or blocks) 120 in a paver block layer 130 shown in FIG. 5B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance LID, and in a second direction, laterally L2, between first and second sides 160A, 160B to side walls 160A1, 160A2 by a lateral distance L2D.

As shown in FIG. 5A, the perimeter (or outer boundary) 180 of the mold 110, e.g., in a plan view, is rectangular. The distance LID between the ends 150A, 150B of the mold 110 is smaller than the distance L2D between the sides 160A, 160B by a ratio of three to three and a half (3×3.5), i.e., forming an aspect ratio of 3.5×3. The mold 110 extends heightwise from a bottom 170A to a top 170B to define a mold height MH.

With reference to FIG. 5A, the mold 110 has internal partition walls 190 that divide the mold 110 into cavities 200 that form the blocks 120. There are three (3) sizes of cavities 200, in the plan view of the mold 110.

The cavities include four (4) square block cavities (for brevity, SBCs), generally referenced as 210, including first through fourth SBCs 210A-210D, each of which are around the perimeter 180, i.e., none is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view and define a first cavity area. The value of the length L as referenced in each of the cavities 200 and blocks 120 is the same as each other.

The cavities 200 form four (4) small (or first) rectangular block cavities (for brevity, small-block cavities or SRBCs), generally referenced as 230, including first through fourth SRBCs 230A-230D, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second cavity area that is smaller than the first cavity area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 5A, the second and third SRBCs 230B-230C correspond with first and second Long-SRBCs 232A-232B. The first and fourth SRBCs 230A, 230D correspond with the first and second Lat-SRBCs 234A-234B.

The cavities 200 form three (3) large (or second) rectangular block cavities (for brevity, large-block cavities or LRBCs), generally referenced as 250, including first through third LRBCs 250A-250C, two of which are along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as either longitudinally extending or laterally extending. A longitudinally extending LRBC (for brevity, a Long-LRBC) 252 is an LRBC 250 with its long side 251A extending in the longitudinal direction L1. A laterally extending LRBC (for brevity, a Lat-LRBC) 254 is a LRBC with its long side 251A extending in the lateral direction L2. As shown in FIG. 5A, the second and third LRBCs 250B, 250C correspond with first and second Long-LRBCs 252A, 252B and the first LRBC 250A corresponds with the first Lat-LRBC 254A.

Along the first end 150A of the mold 110, from the first side 160A to the second side 160B, the cavities 200 are arranged to provide the first Lat-SRBC 234A, the first Long-SRBC 232A, and the first and second SBCs 210A, 210B. Along the second end 150B of the mold 110, from the second side 160B to the first side 160A, the cavities 200 are arranged to provide the third SBC 210C, the second Long-SBRC 232B, the second Lat-SRBC 234B, and the first Long-LRBC 252A.

The first Lat-LRBC 254B is against the second side 160B, between the second and third SBCs 210B, 210C. The fourth SBC 210D is against the first side 160A, between the first Lat-SRBC 234A and the first Long-LRBC 252A. The second Long-LRBC 252B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275 define Ts.

Turning to FIG. 5B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 5B, the perimeter 380 of the layer 130, e.g., in the plan view, is rectangular. The distance LID between the ends 350A, 350B of the layer 130 is smaller than the distance L2D between the sides 360A, 360B by a ratio of three by four (3×4), i.e., forming an aspect ratio of 4×3. The layer 310 extends heightwise from a bottom 370A, which is positioned against a ground, to a top 370B to define a block height BH.

With reference to FIG. 5B, there are three (3) sizes of blocks 120, in the plan view in the layer 130.

The layer 130 includes four (4) square blocks (for brevity, SBs), generally referenced as 410, including first through fourth SB4s 410A-410D, each of which are around the perimeter 180, i.e., none is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has four (4) small (or first) rectangular blocks (for brevity, small-blocks or SRBs), generally referenced as 430, including first through fourth SRBs 430A-430D, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 5B, the second and third SRBs 430B-430C correspond with first and second Long-SRBs 432A-432B and the first and fourth SRBs 430A, 430D correspond with the first and second Lat-SRBs 434A-434B.

The layer 130 has three (3) large (or second) rectangular blocks (for brevity, large-blocks or LRBs), generally referenced as 450, including first through third LRBs 450A-450C, two of which are along the perimeter 180 and one is internal, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as either longitudinally extending or laterally extending. A longitudinally extending LRB (for brevity, a Long-LRB) 452 is an LRB 450 with its long side 451A extending in the longitudinal direction L1. A laterally extending LRB (for brevity, a Lat-LRB) 454 is a LRB with its long side 451A extending in the lateral direction L2. As shown in FIG. 5B, the first and second LRBs 450A, 450B correspond with first and second Long-LRBs 452A, 452B.

Along the first end 350A of the layer 130, from the first side 360A to the second side 360B, the blocks 120 are arranged to provide the first Lat-SRB 434A, the first Long-SRB 432A, and the first and second SBs 410A, 410B. Along the second end 350B of the layer 130, from the second side 360B to the first side 360A, the blocks 120 are arranged to provide the third SB 210C, the second Long-SRB 432B, the second Lat-SRB 434B, and the first Long-LRB 452A.

The first Lat-LRB 454A is against the second side 360B, between the second and third SBs 410B, 410C. The fourth SB 410D is against the first side 360A, between the first Lat-SRB 434A and the first Long-LRB 452A. The second Long-LRB 452B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475 define Ts.

The above mold 110 provides joints between block cavities that are X-less, i.e., the joints define Ts. As such, the layer 130 provides blocks 120 that are arranged in an X-less joint configuration.

Figure 5D:
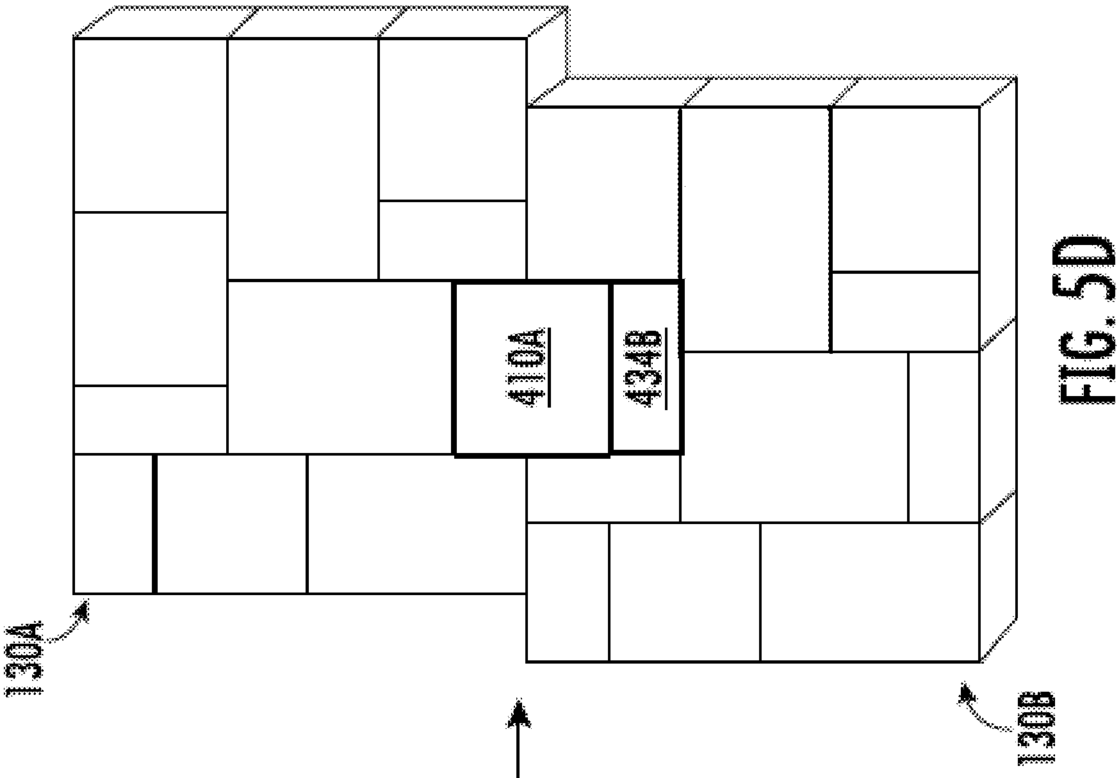
FIG. 5D shows the two layers of blocks configured with an X-less joint pattern.
Figure 5C:
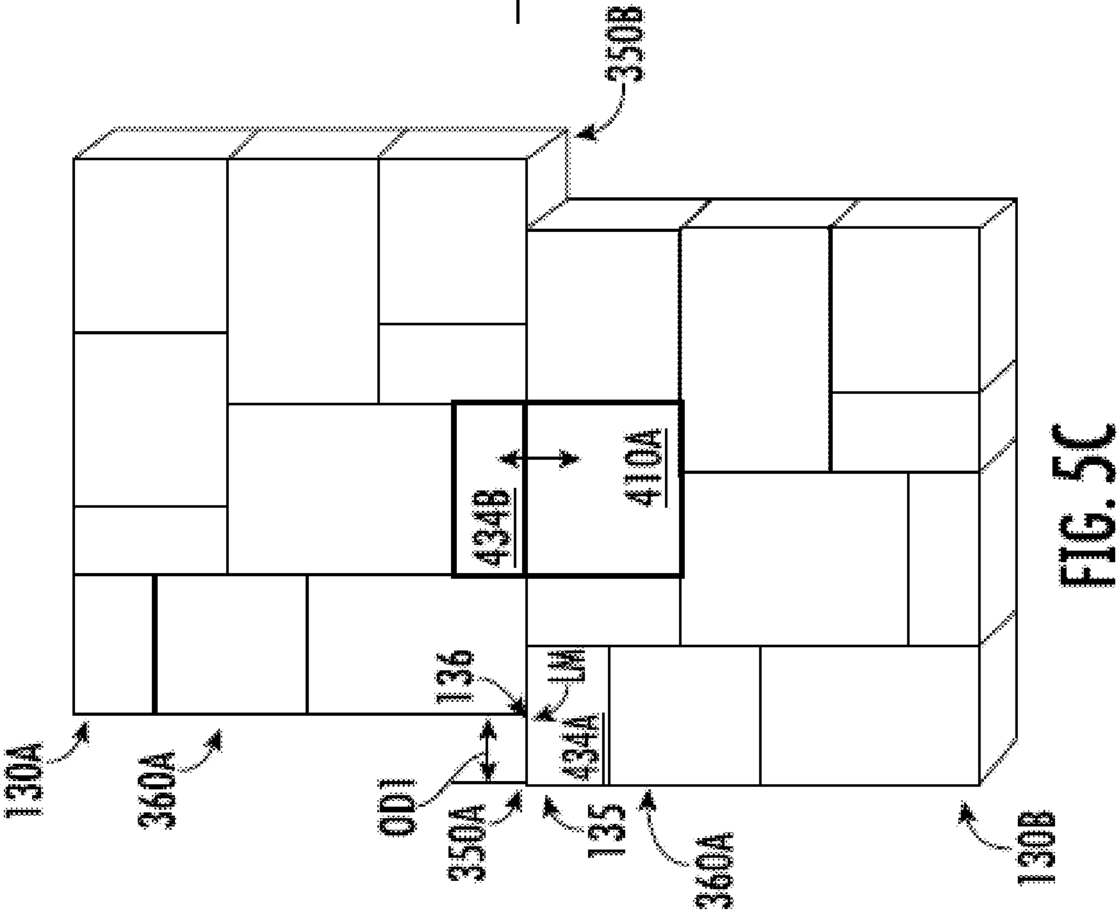
FIG. 5C shows two layers of blocks formed by the mold of FIG. 5A disposed longitudinally against each other and laterally offset from each other.
Figure 5E:
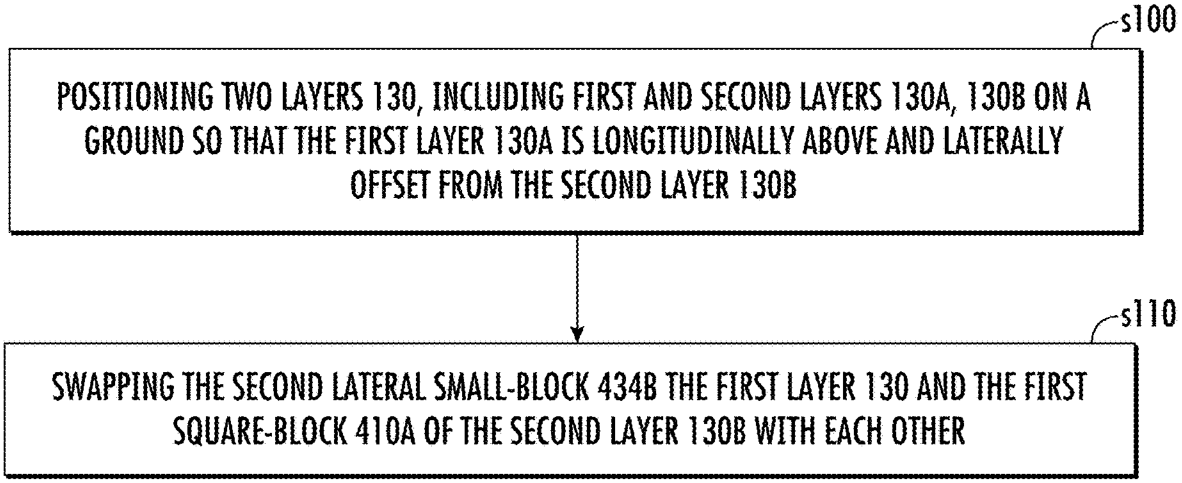
FIG. 5E is a flowchart showing a method of manipulating one block from each of the two layers of blocks shown in FIG. 5D to provide the X-less joint pattern.

Turning to FIGS. 5C-5E, the figures show a method of laying two layers 130A, 130B of the type shown in FIG. 5B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. The second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 5D.

Figure 5F:
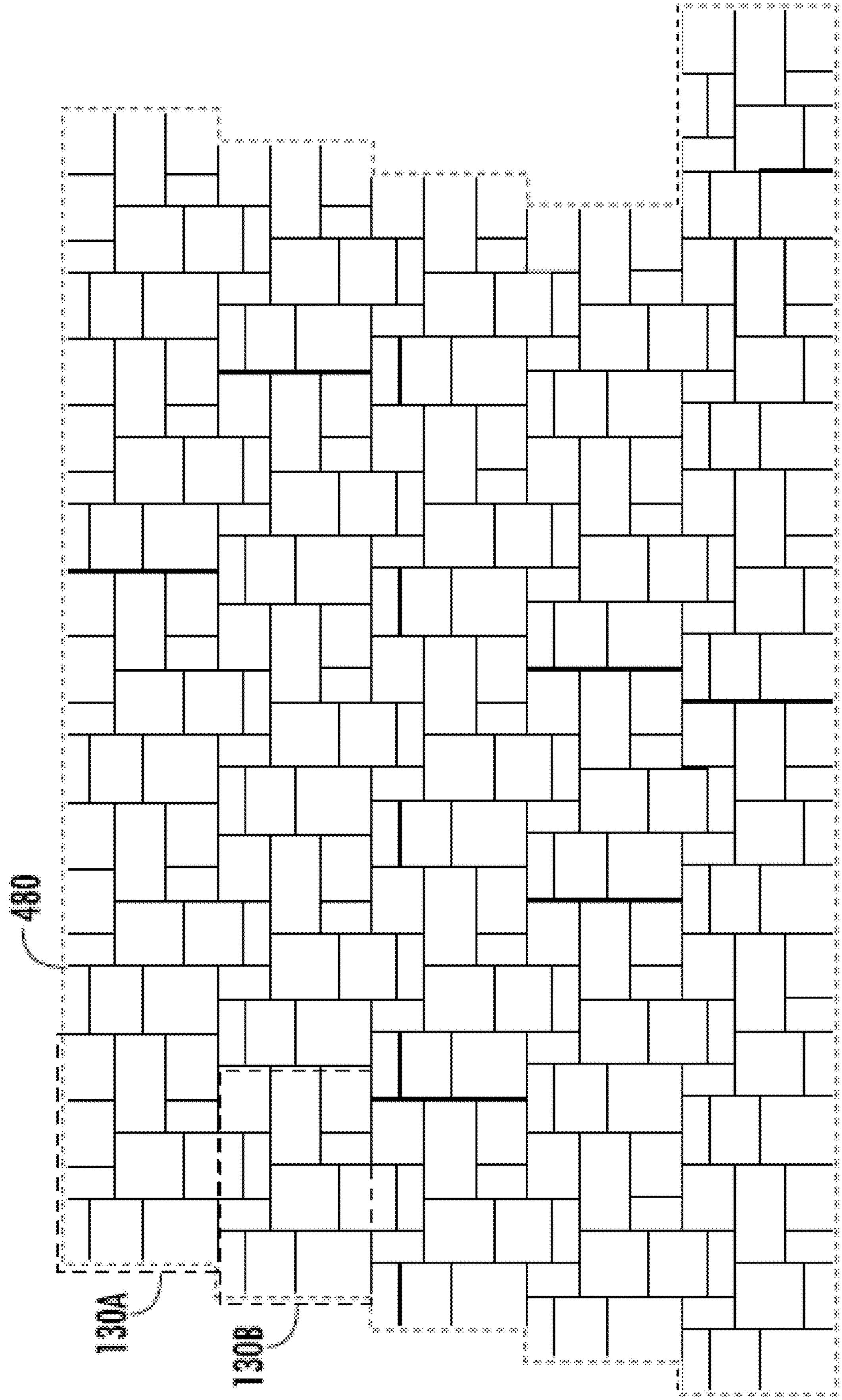
FIG. 5F is a build-out cluster of the layers of FIG. 5B, where longitudinally adjacent ones of the layers are manipulated to provide the X-less joint pattern.

FIG. 5F shows an array 480 of layers 130 of FIG. 5B built-out from the first and second layers 130A, 130B. The array 480 of layers 130 may be laid out over a driveway, roadway, patio, parking lot, park, or any area where pedestrians or automobiles may be located, stationary or moving, indoor or outdoor. The same block swapping of FIG. 5E occurs which each longitudinally adjacent ones of the layers 130 to provide an X-less joint pattern throughout the array 480.

Figure 6B:
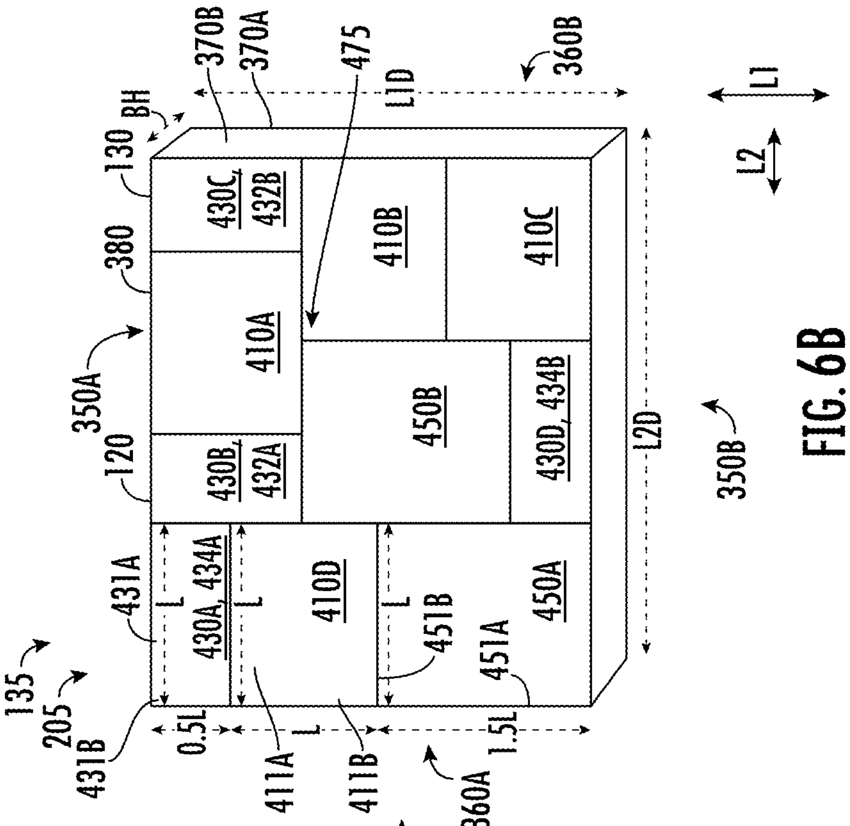
FIG. 6B shows a layer of blocks formed by the mold of FIG. 6A.
Figure 6A:
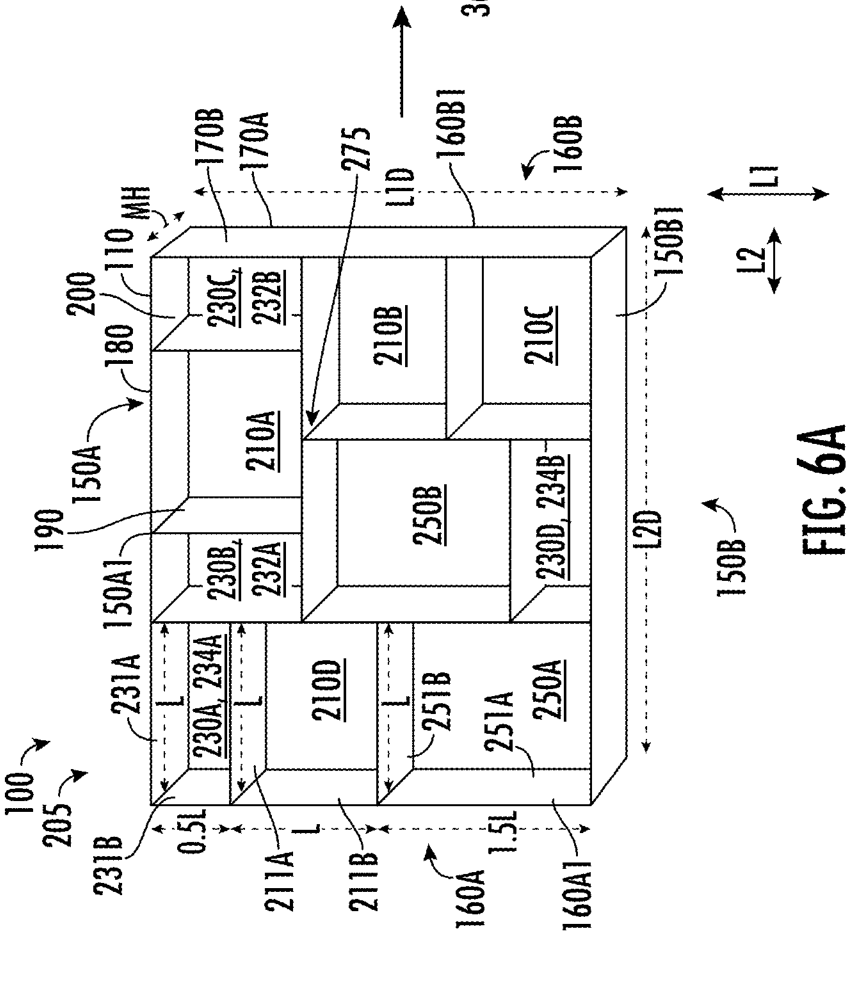
FIG. 6A shows a top plan view of a mold for fabricating paver blocks according to a sixth embodiment.

Turning to FIG. 6A, the figure shows another system 100 for providing a paver block configuration with X-less joints.

More specifically, FIG. 6A shows a top plan view of a mold 110 for fabricating paver blocks (or blocks) 120 in a paver block layer 130 shown in FIG. 6B. As used herein a layer is a grouping of blocks 120 that are configured to be permanently set on a ground surface without extensive reorganization. As discussed in greater detail below, according to the embodiments, when multiple layers 130 are arranged on a ground, adjacent to each other, within and between the layers 130, the blocks 120 have joints that form an X-less joint pattern.

The mold 110 is generally formed so that in the plan view it is shaped as a quadrilateral, though other shapes are within the scope of the disclosure. The mold 110 extends in a first direction, longitudinally L1, between first (or upper) end and second (or lower) end 150A, 150B to end walls 150A1, 150B1 by a longitudinal distance LID, and in a second direction, laterally L2, between first and second sides 160A, 160B to side walls 160A1, 160A2 by a lateral distance L2D.

As shown in FIG. 6A, the perimeter (or outer boundary) 180 of the mold 110, e.g., in a plan view, is square. The distance LID between the ends 150A, 150B of the mold 110 is the same as the distance L2D between the sides 160A, 160B. The mold 110 extends height-wise from a bottom 170A to a top 170B to define a mold height MH.

With reference to FIG. 6A, the mold 110 has internal partition walls 190 that divide the mold 110 into cavities 200 that form the blocks 120. There are three (3) sizes of cavities 200, in the plan view of the mold 110.

The cavities include four (4) square block cavities (for brevity, SBCs), generally referenced as 210, including first through fourth SBCs 210A-210D, each of which are around the perimeter 180, i.e., none is internal (spaced from the perimeter). For convenience, cavities are labeled in clockwise order, from a first corner 205 defined by the intersection of the first end 150A and the first side 160A, with cavities along the perimeter 180 labeled first followed by internal cavities. The SBCs 210 each have first and second side walls (or sides) 211A, 211B, each having a length L, so that the SBCs 210 have an L×L ratio in the plan view and define a first cavity area. The value of the length L as referenced in each of the cavities 200 and blocks 120 is the same as each other.

The cavities 200 form four (4) small (or first) rectangular block cavities (for brevity, small-block cavities or SRBCs), generally referenced as 230, including first through fourth SRBCs 230A-230D, all of which are around the perimeter 180, each having half (0.5) of a surface area (plan view) of the SBCs 210. The SRBCs 230 each have first and second side walls (or sides) 231A, 231B, with a first side that is a long side having a length L and a second side that is a short side having a length that is one-half (i.e., 0.5) L, such that the SRBCs 230 have a L×0.5L ratio in the plan view, defining a second cavity area that is smaller than the first cavity area.

The SRBCs 230 are arranged as either longitudinally extending or laterally extending. A longitudinally extending SRBC (for brevity, a Long-SRBC) 232 is an SRBC 230 with its long side 231A extending in the longitudinal direction L1. A laterally extending SRBC (for brevity, a Lat-SRBC) 234 is an SRBC 230 with its long side 231A extending in the lateral direction L2. As shown in FIG. 6A, the second and third SRBCs 230B-230C correspond with first and second Long-SRBCs 232A-232B. The first and fourth SRBCs 230A, 230D correspond with the first and second Lat-SRBCs 234A-234B.

The cavities 200 form two (2) large (or second) rectangular block cavities (for brevity, large-block cavities or LRBCs), generally referenced as 250, including first and second LRBCs 250A-250B, one of which is along the perimeter 180 and one is internal, each having one and a half (i.e., 1.5) times the surface area (plan view) of the SBCs 210. The LRBCs 250 each have first and second side walls (or sides) 251A, 251B, with a first side that is a long side having a length that is one and a half (i.e., 1.5) times L and a second side that is a short side having a length that is L, such that the LRBCs 250 have a 1.5L×L ratio in the plan view, defining a third cavity area that is larger than the first cavity area.

The LRBCs 250 are arranged as longitudinally, i.e., with their long sides 251A extending in the longitudinal direction L1.

Along the first end 150A of the mold 110, from the first side 160A to the second side 160B, the cavities 200 are arranged to provide the first Lat-SRBC 234A, the first Long-SRBC 232A, and the first SBC 210A, and the second Long-SRBC 232B. Along the second end 150B of the mold 110, from the second side 160B to the first side 160A, the cavities 200 are arranged to provide the third SBC 210C, the second Lat-SRBC 234B, and the first LRBC 250A.

The second SBC 210B is against the second side 160B, between the second Long-SRBC 232B and the third SBC 210C. The fourth SBC 210D is against the first side 160A, between the first Lat-SRBC 234A and the first Long-LRBC 252A. The second LRBC 250B is internal and is longitudinally against the second Lat-SRBC 234B.

The mold defines joints 275 between block cavities 200. As shown in the figure, with the configuration of the cavities 200 in the mold 110, the joints 275 define an X-less pattern. For example, the joints 275 define Ts.

Turning to FIG. 6B, the layer 130 is configured so that, when it is printed from the mold 110, the size, shape, orientation and placement of the blocks 120 matches that of the cavities 200.

More specifically, the layer 130 in the plan view is generally defined as a quadrilateral, though other shapes are within the scope of the disclosure. The layer 130 extends in a first direction, longitudinally L1, between first (or upper) end and second (or lower) end 350A, 350B, and in a second direction, laterally L2, between first and second sides 360A, 360B.

As shown in FIG. 6B, the perimeter 380 of the layer 130, e.g., in the plan view, is rectangular. The distance LID between the ends 350A, 350B of the layer 130 is the same as the distance L2D between the sides 360A, 360B. The layer 310 extends heightwise from a bottom 370A, which is positioned against a ground, to a top 370B to define a block height BH.

With reference to FIG. 6B, there are three (3) sizes of blocks 120, in the plan view in the layer 130.

The layer 130 includes four (4) square blocks (for brevity, SBs), generally referenced as 410, including first through fourth SB4s 410A-410D, each of which are around the perimeter 180, i.e., none is internal (spaced from the perimeter). For convenience, blocks are labeled in clockwise order, from the first corner 135 defined by the intersection of the first end 350A and the first side 360A, with blocks 120 along the perimeter 380 labeled first followed by internal blocks. The SBs 410 each have first and second sides 411A, 411B, each having a length L, so that the SBs 410 have an L×L ratio in the plan view and define a first block area.

The layer 130 has four (4) small (or first) rectangular blocks (for brevity, small-blocks or SRBs), generally referenced as 430, including first through fourth SRBs 430A-430D, each having half a surface area (plan view) of the SBs 410. The SRBs 430 each have a first and second sides 431A, 431B, with a first side that is a long side having a length L and a second side that is a short side having a length that is one-half (i.e., 0.5) L, such that the SRBs 430 have a L×0.5L ratio in the plan view, defining a second block area that is smaller than the first block area.

The SRBs 430 are arranged as either longitudinally extending or laterally extending. A longitudinally extending SRB (for brevity, a Long-SRB) 432 is an SRB 430 with its long side 431A extending in the longitudinal direction L1. A laterally extending SRB (for brevity, a Lat-SRB) 434 is an SRB 430 with its long side 431A extending in the lateral direction L2. As shown in FIG. 6B, the second and third SRBs 430B-430C correspond with first and second Long-SRBs 432A-432B and the first and fourth SRBs 430A, 430D correspond with the first and second Lat-SRBs 434A-434B.

The layer 130 has two (2) large (or second) rectangular blocks (for brevity, large-blocks or LRBs), generally referenced as 450, including first and second LRBs 450A-450B, one of which are along the perimeter 180 and one is internal, each having one and a half (i.e., 1.5) times the surface area (plan view) of the SBs 410. The LRBs 450 each have first and second sides 451A, 451B, with a first side that is a long side having a length that is one and a half (i.e., 1.5) times L and a second side that is a short side having a length that is L, such that the LRBs 450 have a 1.5L×L ratio in the plan view, defining a third block area that is larger than the first block area.

The LRBs 450 are arranged as longitudinally, i.e., with their long sides 451A extending in the longitudinal direction L1.

Along the first end 350A of the layer 130, from the first side 360A to the second side 360B, the blocks 120 are arranged to provide the first Lat-SRB 434A, the first Long-SRB 432A, and the first SB 410A and the second Long-SRB 432B. Along the second end 350B of the layer 130, from the second side 360B to the first side 360A, the blocks 120 are arranged to provide the third SB 210C, the second Lat-SRB 434B, and the first Long-LRB 452A.

The second SB 410B is against the second side 360B, between the second Long-SRB 432B and the third SB 410C. The fourth SB 410D is against the first side 360A, between the first Lat-SRB 434A and the first Long-LRB 452A. The second LRB 450B is internal and is longitudinally against the second Lat-SRB 434B.

The layer 130 defines joints 475 between the blocks. As shown in the figure, with the configuration of the blocks 120 in the layer 130, the joints 475 define an X-less pattern. For example, the joints 475 define Ts.

The above mold 110 provides joints between block cavities that are X-less, i.e., the joints define Ts. As such, the layer 130 provides blocks 120 that are arranged in an X-less joint configuration.

Figure 6D:
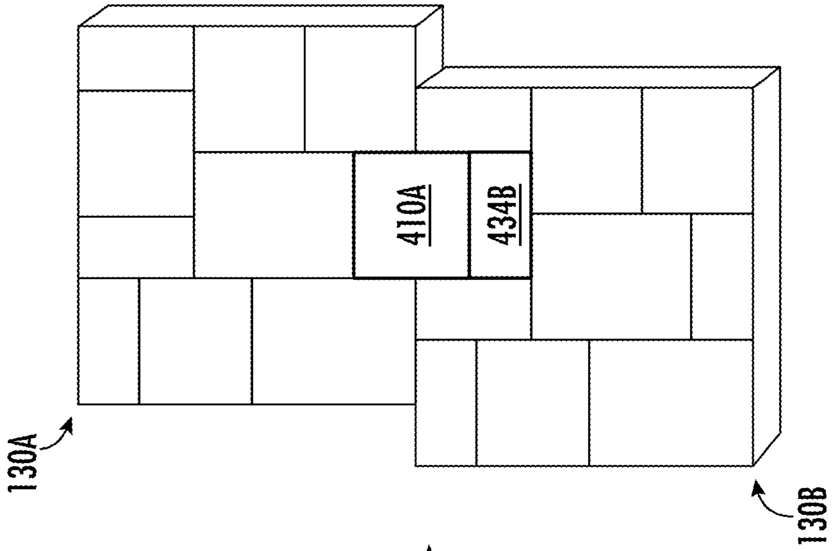
FIG. 6D shows the two layers of blocks configured with an X-less joint pattern.
Figure 6C:
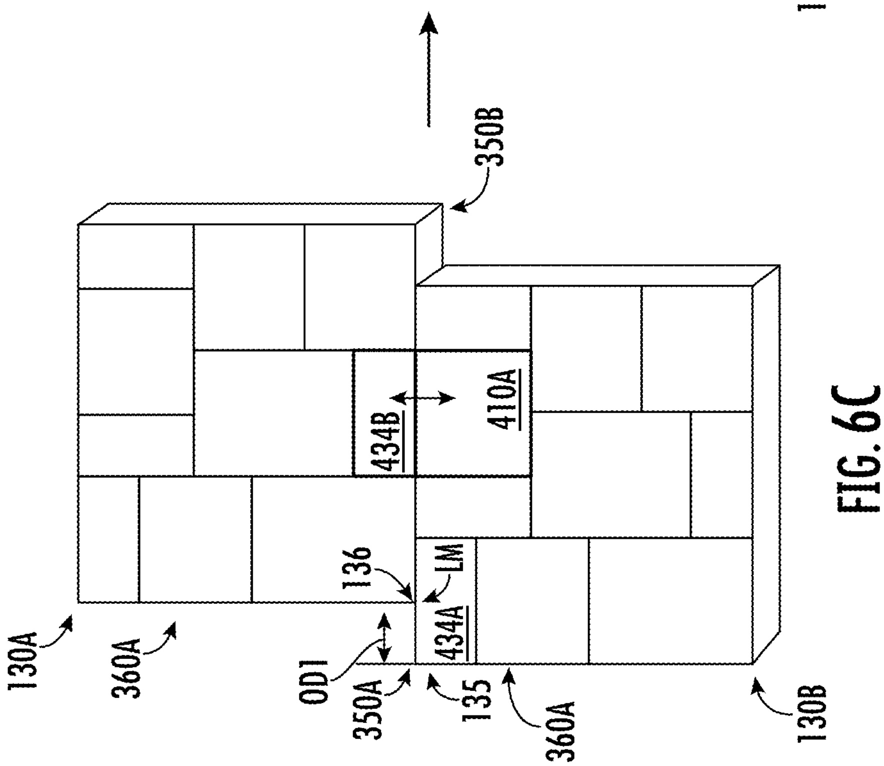
FIG. 6C shows two layers of blocks formed by the mold of FIG. 6A disposed longitudinally against each other and laterally offset from each other.
Figure 6E:
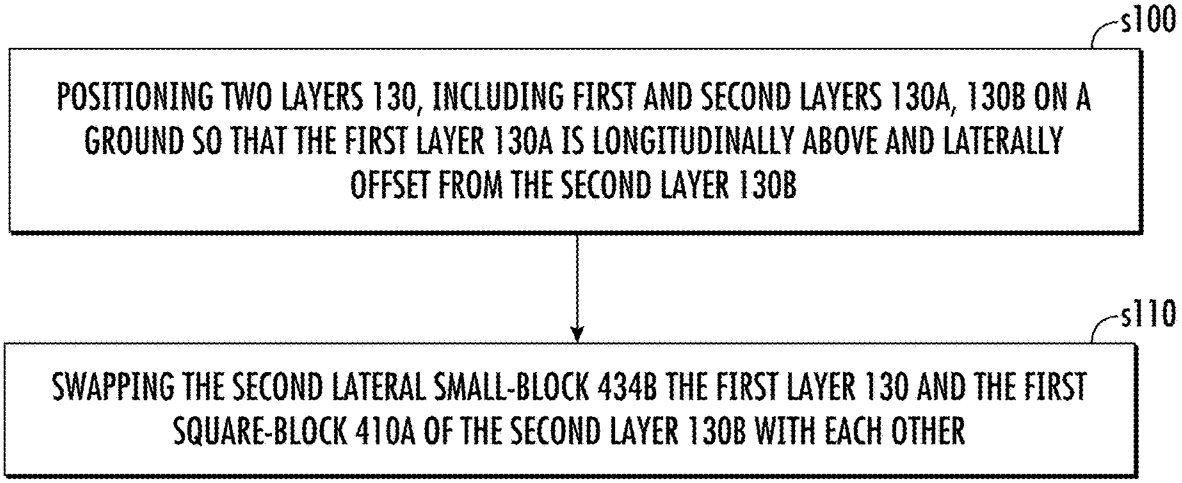
FIG. 6E is a flowchart showing a method of manipulating one block from each of the two layers of blocks shown in FIG. 6D to provide the X-less joint pattern.

Turning to FIGS. 6C-6E, the figures show a method of laying two layers 130A, 130B of the type shown in FIG. 6B, longitudinally adjacent to each other, to provide an X-less joint configuration for the layers.

As shown in step S100 the method includes positioning two layers 130, including first and second layers 130A, 130B on a ground so that the first layer 130A is longitudinally above and laterally offset from the second layer 130B. Specifically, a lower end 350B of the first layer 130A is against the upper end 350A of the second layer 130B. The first and second layers are laterally offset from each other by an offset distance OD1 equal to half (0.5) of L, e.g., between the first corner 135 of the second layer 130B and a second corner 136 of the first layer 130A. The second corner 136 is defined by an intersection of the first side 360A and the lower end 350B. With this configuration, the second corner 136 of the first layer 130A terminates at a lateral midpoint LM of the first Lat-SRB 434A of the second layer 130B. The second Lat-SRB 434B of the first layer 130 and the first SB 410A of the second layer 130B are laterally aligned and longitudinally adjacent to each other. As shown in step S110, the method includes swapping the second Lat-SRB 434B of the first layer 130 and the first SB 410A of the second layer 130B with each other. The resulting configuration of the first and second layers 130A, 130B provides an X-less joint pattern as shown in FIG. 6D.

Figure 6F:
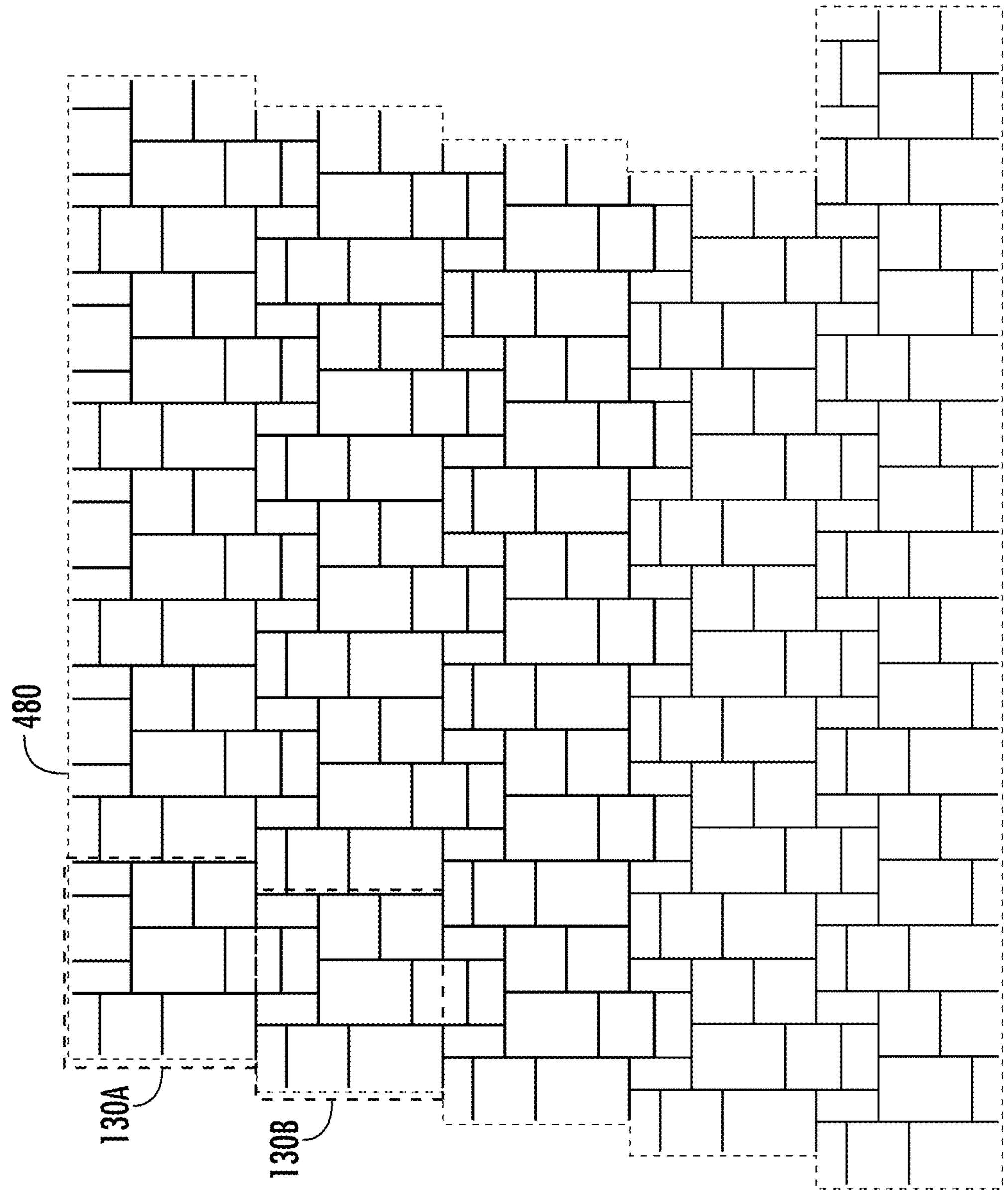
FIG. 6F is a build-out cluster of the layers of FIG. 6B, where longitudinally adjacent ones of the layers are manipulated to provide the X-less joint pattern.

FIG. 6F shows an array 480 of layers 130 of FIG. 6B built-out from the first and second layers 130A, 130B. The array 480 of layers 130 may be laid out over a driveway, roadway, patio, parking lot, park, or any area where pedestrians or automobiles may be located, stationary or moving, indoor or outdoor. The same block swapping of FIG. 6E occurs which each longitudinally adjacent ones of the layers 130 to provide an X-less joint pattern throughout the array 480.

Several common aspects to the above embodiments will now be identified with further reference to FIG. 1A as a non-limiting example. The mold 110 for the paver block layer 130 includes a mold outer boundary 180 that defines a square or rectangular shape. Within the mold outer boundary 180, the mold defines block shaped cavities 200. The cavities 200 include square block cavities 210, each having a first cavity area. The cavities 200 include small block cavities 230, each having a second cavity area that is smaller than first cavity area. The cavities 200 include large block cavities 250, each having a third cavity area that is larger than the first cavity area. Block joints 275 are defined by the mold 110, between adjacent ones of the block cavities 200, and the block joints 274 define an X-less configurations. The small and large block cavities 230, 250 are rectangular.

Each of the square block cavities 210 is defined by side walls 211A, 211B having a length L. Each of the small block cavities 230 is defined by first and second sidewalls 231A, 231B having respective lengths L and 0.5L. Each of the large block cavities 250 is defined by first and second sidewalls 251A, 251B having respective lengths 1.5L and L.

The mold outer boundary 180 is defined by first and second ends 150A, 150B that are spaced apart from each other by a longitudinal distance LID. First and second sides 160A, 160B are spaced apart from each other by a lateral distance L2D. The mold outer boundary 180 defines one of a square, an aspect ratio of 3.5 to 3, or an aspect ratio of 4 to 3. In a rectangular configuration, the lateral distance is greater than the longitudinal distance.

Along the first side 160A of the mold 110, from the first end to the second end 150A, 150B, the mold 1110 includes a first small block cavity 230A, a first square block cavity 210D, and a first large block cavity 250B. The first small block cavity 230A is oriented so that the first sidewall 231A extends laterally. The first large block cavity 250B is oriented so that the first sidewall 251A extends longitudinally.

Laterally adjacent to the first small block cavity 230, along the first end 150A, is a second small block cavity 230B. Laterally adjacent to the first large block cavity 250B, along the second end 150B, is a third small block cavity 230D. Longitudinally between the second and third small block cavities 230B, 230D is a second large block cavity 250D. The second small block cavity 230B is oriented so that the first sidewall 231A extends longitudinally. The third small block cavity 230D is oriented so that the first sidewall 231A extends laterally. The second large block cavity 250C is oriented so that the first sidewall 251A extends longitudinally.

Laterally adjacent to the second small block cavity 230B, along the first end 150A, is a second square block cavity 210A.

The paver blocks 120 may be made of concrete, for example a low slump mix, as a non-limiting material example.

Figure 7:
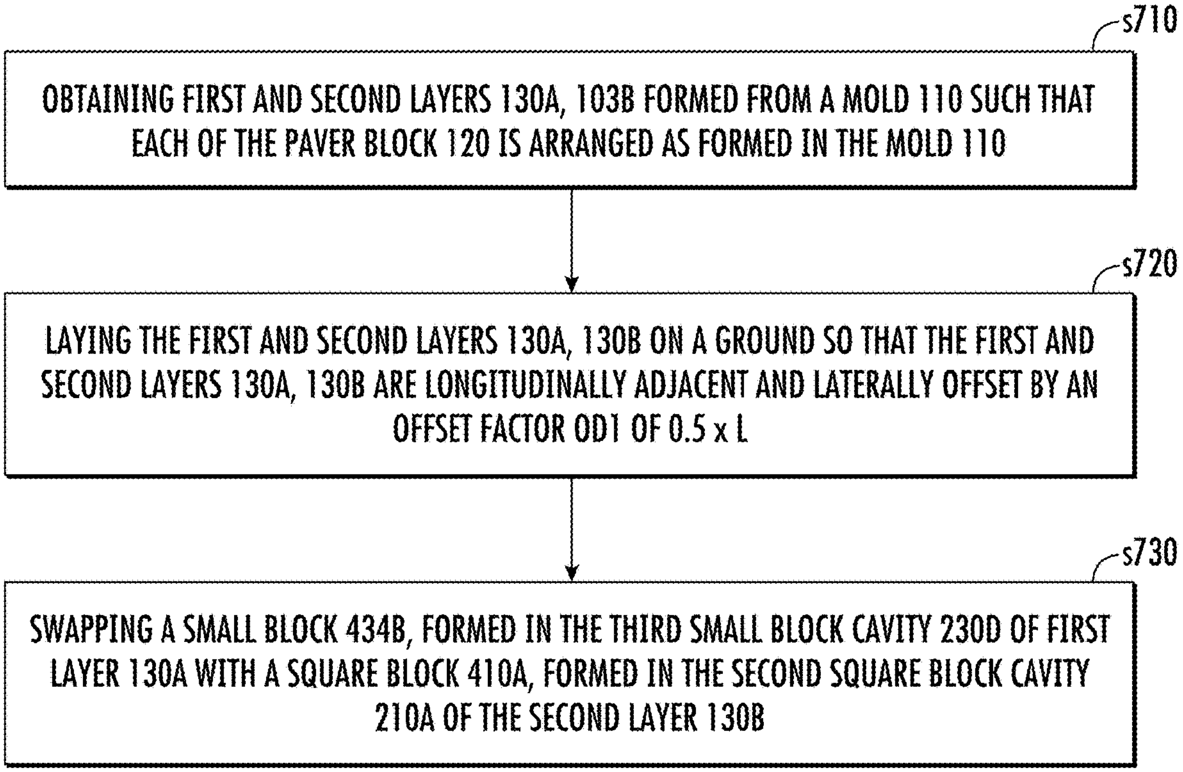
FIG. 7 is another flowchart showing a method of organizing layers of paver blocks.

Turning FIG. 7, and with further reference to FIGS. 1C and 1D, another flowchart shows common aspects of the embodiments. Specifically, the flowchart shows a method of organizing layers 130 of paver blocks 120. As shown in step 710, the method includes obtaining first and second layers 130A, 130B formed from a mold 110 disclosed herein such that each of the paver block 120 is arranged as formed in the mold 110. As shown in step 720, the method includes laying the first and second layers 130A, 130B on a ground so that the first and second layers 130A, 130B are longitudinally adjacent and laterally offset by an offset factor OD1 of 0.5×L. When laid on ground, so that the first end 350A of the second layer 130B is adjacent to the second end 350B of the first layer 130A, and a lower corner 136 of the first layer 130, defined by an intersection of the first side 360A and the second end 350B of the first layer 130A, is located along the first end 350A of the second layer 130B. As shown in step 730, the method includes swapping a small block 434B, formed in the third small block cavity 230D (FIG. 1A) of first layer 130A with a square block 410A, formed in the second square block cavity 210A (FIG. 1A) of the second layer 130B. This action obtains an X-less joint pattern.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

I claim:

1. A mold for a configuration of a paver block layer, comprising:

a mold outer boundary that defines a rectangular shape having first and second ends that are longitudinally spaced apart from each other, and first and second sides that are laterally spaced apart from each other, and within the mold outer boundary, the mold defines block shaped cavities that consist of three sizes of blocks shaped cavities, including:

square block cavities, each having a first cavity area;

small block cavities, each having a second cavity area that is smaller than first cavity area;

large block cavities, each having a third cavity area that is larger than the first cavity area, wherein:

the small and large block cavities are rectangular; and along the first side, from the first end to the second end, the mold consists of three block cavities, including a first small block cavity that extends laterally, a first square block cavity, and a first large block cavity that extends longitudinally; and wherein:

along the first end: adjacent to the first small block cavity, is a second small block cavity that extends longitudinally and is thereby perpendicular to the first small block cavity;

and a second square block cavity is adjacent to the second small block cavity; and along the second end, adjacent to the first large block cavity, is a third small block cavity that extends laterally and is thereby perpendicular to the first large block cavity; and wherein:

block joints are defined by the mold, between adjacent ones of the block cavities; and the block joints define an X-less configuration.

2. The mold of claim 1, wherein:

each of the square block cavities is defined by sidewalls having a length L;

each of the small block cavities is defined by first and second sidewalls having respective lengths L and 0.5L; and each of the large block cavities is defined by first and second sidewalls having respective lengths 1.5L and L.

3. The mold of claim 2, wherein:

the mold outer boundary defines an aspect ratio such that the lateral distance is greater than the longitudinal distance.

4. The mold of claim 1, wherein:

the mold has an aspect ratio of 4×3 and includes one of:

(i) five square block cavities;

five small block cavities; and three large block cavities; or (ii) four square block cavities;

four small block cavities; and four large block cavities.

5. The mold of claim 1, wherein:

the mold has an aspect ratio of 3.5×3 and includes one of:

(i) four square block cavities;

four small block cavities; and three large block cavities; or (ii) five square block cavities;

five small block cavities; and two large block cavities.

6. A layer of paver blocks formed with the mold of claim 1.

7. A method of organizing layers of paver blocks, comprising:

obtaining a first layer of paver blocks and a second layer of paver blocks formed from the mold of claim 1, wherein each of the paver blocks is arranged as formed in the mold;

laying the first and second layers on a ground so that the first and second layers are longitudinally adjacent to each other and laterally offset from each other by an offset factor,
so that:
the first end of the second layer is adjacent to the second end of the first layer; and
a lower corner of the first layer, defined by an intersection of the first side and the second end of the first layer, is located along the first end of the second layer; and
swapping a small block formed in the third small block cavity of first layer with a square block formed in the second square block cavity of the second layer,
thereby the square block extends between the first and second layers, and an X-less joint pattern is obtained within and between the first and second layers.

8. The method of claim 7, wherein the offset factor is 0.5L.

9. A mold for a configuration of a paver block layer, comprising:
a mold outer boundary that defines a square shape having first and second ends that are longitudinally spaced apart from each other, and first and second sides that are laterally spaced apart from each other, and
within the mold outer boundary, the mold defines block shaped cavities that consist of three sizes of blocks shaped cavities, including:
square block cavities, each having a first cavity area;
small block cavities, each having a second cavity area that is smaller than first cavity area;
large block cavities, each having a third cavity area that is larger than the first cavity area,
wherein:
the small and large block cavities are rectangular;
along the first side, from the first end to the second end, the mold consists of three block cavities, including a first small block cavity that extends laterally, a first square block cavity, and a first large block cavity that extends longitudinally; and
wherein:
along the first end: adjacent to the first small block cavity, is a second small block cavity that extends longitudinally and is thereby perpendicular to the first small block cavity; and a second square block cavity is adjacent to the second small block cavity; and
along the second end, adjacent to the first large block cavity, is a third small block cavity that extends laterally and is thereby perpendicular to the first large block cavity; and
wherein:
block joints are defined by the mold, between adjacent ones of the block cavities; and
the block joints define an X-less configuration.

10. The mold of claim 9, wherein:
each of the square block cavities is defined by sidewalls having a length L;
each of the small block cavities is defined by first and second sidewalls having respective lengths L and 0.5L; and
each of the large block cavities is defined by first and second sidewalls having respective lengths 1.5L and L.

11. The mold of claim 9, wherein:
the mold includes:
four square block cavities;
four small block cavities; and
two large block cavities.

12. A layer of paver blocks formed with the mold of claim 9.

13. A method of organizing layers of paver blocks, comprising:
obtaining a first layer of paver blocks and a second layer of paver blocks formed from the mold of claim 9,
wherein each of the paver blocks is arranged as formed in the mold;
laying the first and second layers on a ground so that the first and second layers are longitudinally adjacent to each other and laterally offset from each other by an offset factor,
so that:
the first end of the second layer is adjacent to the second end of the first layer; and
a lower corner of the first layer, defined by an intersection of the first side and the second end of the first layer, is located along the first end of the second layer; and
swapping a small block formed in the third small block cavity of first layer with a square block formed in the second square block cavity of the second layer,
thereby one of the square block between the first and second layers, and an X-less joint pattern is obtained within and between the first and second layers.

14. The method of claim 13, wherein the offset factor is 0.5L.

15. A method of organizing layers of paver blocks, comprising:
obtaining a first layer of paver blocks and a second layer of paver blocks,
wherein, each of the layers:
defines a layer outer boundary that is a rectangular or square shape, having first and second ends that are longitudinally spaced apart from each other, and first and second sides that are laterally spaced apart from each other;
consists of three sizes of paver blocks, including:
square blocks, each having a first area;
small blocks, each having a second area that is smaller than first area; and
large blocks, each having a third area that is larger than the first area;
wherein:
the small and large blocks are rectangular;
along the first side, from the first end to the second end, the layer consists of three blocks, including a first small block that extends laterally, a first square block, and a first large block that extends longitudinally; and
wherein:
along the first end: adjacent to the first small block, is a second small block that extends longitudinally and is thereby perpendicular to the first small block; and a second square block is adjacent to the second small block; and
along the second end, adjacent to the first large block, is a third small block that extends laterally and is thereby perpendicular to the first large block; and
wherein:
block joints are defined between adjacent ones of the blocks; and
the block joints define an X-less configuration;
wherein, in each of the layers:
each of the square blocks is defined by sidewalls having a length L;
each of the small blocks is defined by first and second sidewalls having respective lengths L and 0.5L; and each of the large blocks is defined by first and second sidewalls having respective lengths 1.5L and L;

the method further includes:

laying the first and second layers on a ground so that the first and second layers are longitudinally adjacent to each other and laterally offset from each other by an offset factor, so that:

the first end of the second layer is adjacent to the second end of the first layer; and a lower corner of the first layer, defined by an intersection of the first side and the second end of the first layer, is located along the first end of the second layer; and swapping the third small block of first layer with the second square block of the second layer, thereby the second square block extends between the first and second layers, and an X-less joint pattern is obtained within and between the first and second layers.

16. The method of claim 15, wherein the layer outer boundary is the rectangular shape.

17. The method of claim 16, wherein the offset factor is 0.5L.

18. The method of claim 15, wherein the layer outer boundary is the square shape.

19. The method of claim 18, wherein the offset factor is 0.5L.

20. The method of claim 15, wherein:

for each of the layers, the layer outer boundary is a rectangular shape, has an aspect ratio of 4×3, and includes one of:

(i) five square blocks;

five small blocks; and three large blocks; or (ii) four square blocks;

four small blocks; and four large blocks.

21. The method of claim 15, wherein:

for each of the layers, the layer outer boundary is a rectangular shape, has an aspect ratio of 3.5×3, and includes one of:

(i) four square blocks;

four small blocks; and three large blocks; or (ii) five square blocks;

five small blocks; and two large blocks.

22. The method of claim 15, wherein:

for each of the layers, the layer outer boundary is a square shape, and includes:

four square blocks;

four small blocks; and two large blocks.

* * * * *